US006527888B2

(12) United States Patent
Williams et al.

(10) Patent No.: US 6,527,888 B2
(45) Date of Patent: Mar. 4, 2003

(54) SURVEILLANCE TAG APPLICATOR

(75) Inventors: Edward F. Williams, Derry, NH (US); Frank A. James, Nashua, NH (US); Jeffrey C. Lindberg, Merrimack, NH (US)

(73) Assignee: Shrink Packaging Systems Corporation, Nashua, NH (US)

( * ) Notice: Subject to any disclaimer, the term of this patent is extended or adjusted under 35 U.S.C. 154(b) by 0 days.

(21) Appl. No.: 09/853,432

(22) Filed: May 11, 2001

(65) Prior Publication Data

US 2002/0005254 A1 Jan. 17, 2002

Related U.S. Application Data

(60) Provisional application No. 60/204,974, filed on May 17, 2000.

(51) Int. Cl.[7] .................................................. B32B 31/00

(52) U.S. Cl. ......................... 156/64; 156/361; 156/363; 156/566; 156/567; 156/DIG. 28

(58) Field of Search .......................... 156/64, 357, 363, 156/542, 541, 566, 567, DIG. 28, DIG. 30, DIG. 33, DIG. 37, 361

(56) References Cited

U.S. PATENT DOCUMENTS

| | | | | |
|---|---|---|---|---|
| 2,621,434 A | | 12/1952 | Jackson et al. | |
| 4,294,644 A | * | 10/1981 | Anderson | 156/361 |
| 4,347,094 A | | 8/1982 | Watanabe | 156/387 |
| 4,488,925 A | | 12/1984 | Craig et al. | 156/351 |
| 4,798,648 A | | 1/1989 | Freeman | 156/542 |
| 4,842,660 A | | 6/1989 | Voltmer et al. | 156/64 |
| 5,061,334 A | | 10/1991 | Paules | 156/235 |
| 5,102,485 A | | 4/1992 | Keeler et al. | 156/256 |
| 5,256,239 A | | 10/1993 | Voltmer et al. | 156/362 |
| 5,429,576 A | | 7/1995 | Doderer-Winkler | 493/214 |
| 5,458,728 A | * | 10/1995 | Galchefski | 156/448 |
| 5,489,360 A | | 2/1996 | Shimizu et al. | 156/542 |
| 5,545,286 A | | 8/1996 | Schaupp | 156/570 |
| 5,645,680 A | | 7/1997 | Rietheimer | 156/567 |
| 5,676,629 A | | 10/1997 | Andersson | 493/379 |
| 5,829,351 A | | 11/1998 | Anderson et al. | 101/36 |
| 5,849,142 A | | 12/1998 | Fuehrer et al. | 156/556 |
| 5,882,474 A | | 3/1999 | Gomes et al. | 156/556 |
| 5,925,214 A | | 7/1999 | Klein et al. | 156/556 |

* cited by examiner

*Primary Examiner*—Richard Crispino
*Assistant Examiner*—Sue A. Purvis
(74) *Attorney, Agent, or Firm*—Pearson & Pearson, LLP

(57) ABSTRACT

A surveillance tag applicator for applying tags to articles such as box blanks, blister cards, or containers at very high rates of speed up to and greater than 1000 tags per minute. The applicator comprises a plurality of tags attached to a web fed to a rotating drum having a plurality of slots, a compression roller for pressing each of the tags into one of the plurality of slots, an ejector arm for ejecting each tag from the slots onto a selected location of an article passing by the drum, a stripper to remove the web from the tags, and a winder assembly for rewinding the web devoid of tags. A first servo motor drives the rotating drum and a second servo motor drives the ejector arm. A controller provides the timing and control for the servo motors and operation of the tag applicator.

30 Claims, 16 Drawing Sheets

SURVEILLANCE TAG APPLICATOR

BACKGROUND OF THE INVENTION

This is a nonprovisional patent application claiming priority of provisional application for patent Ser. No. 60/204,974 filed May 17, 2000.

FIELD OF THE INVENTION

The present invention relates generally to an apparatus and method for transferring tags to articles such as box blanks, blister cards, boxes or other containers, and in particular to a very high speed surveillance tag applicator apparatus having an indexed rotating drum with a plurality of slots around the circumference of the drum for receiving surveillance tags and then transferring the tags onto the articles either perpendicular to or parallel to the direction of travel of the moving articles.

DESCRIPTION OF RELATED ART

Transferring "tags" with an adhesive backing from a storage material (such as mylar or other similar materials) to a target article within required specifications is extremely difficult, particularly when the target material is moving at high rates of speed. The current average speed to apply "tags" is about 200 to 300 per minute. Speeds required by the industry are now 1000 tags per minute or greater.

U.S. Pat. No. 2,621,434, issued Dec. 16, 1952 to E. W. Jackson et al. discloses a stamp transferring mechanism for applying stamps to successive packages as they travel past a fixed point A. The mechanism comprises a rotatable mounted wheel having on its peripheral surface a plurality of protruding stamp carrying pads spaced circumferentially to correspond to the center-to-center spacing of the successive packages, a conveyor spaced from the wheel for carrying the objects past the fixed point and a motor for moving the wheel via a belt. The stamps are picked up by the stamp-carrying pads of the wheel by the contact between web and these pads, which contact occurs at a point B. However, problems occur when the product is not evenly spaced on the conveyor. "Tag" speeds and accuracy may be compromised. The vacuum applied to the "tag" may not separate the "tag" from the web as in the case of a label. Also, this mechanism cannot handle box blanks coming at random spacing between blanks, and it cannot be rotated to put labels on at right angles to the direction of labels coming off a carrier web.

U.S. Pat. No. 5,061,334, issued Oct. 29, 1991 to Eugene H. Paules discloses a high speed labeling (400 articles per minute) machine for transferring labels to articles such as cans. A label reel supplies pressure sensitive labels of the carrier tape. The carrier tape is fed to a feed-on roller and then onto a label transfer wheel. The transfer wheel holds the labels by vacuum suction on label pads while the spent carrier tape is removed by uptake reel. A glue supply wheel and glue applicator wheel are used when applying non-pressure sensitive labels. However, the speed of this machine is not fast enough for the requirements of the industry. The vacuum may not hold the pitch on the drum at higher stop-and-start speeds, and this labeling machine cannot handle randomly spaced items coming to the labeler.

U.S. Pat. No. 5,256,239, issued Oct. 26, 1993 to Helmet Voltmer and Urs Reuteler and assigned to New Jersey Machine, Inc. of Lebanon, N.H. discloses a continuously moving web pressure-sensitive labeler. The labels are carried initially by a web from a label unwind disc to a label applying drum after passing over a tension control liner. The Drum applies a vacuum to the labels, stripping them from the web at a peel plate and carrying stripped labels to a label applying station adjacent to conveyor. A feed roll driven by a servomotor advances the web to the drum. After the labels are stripped from the web, the web is wound on a backing rewind disc after passing over a tension control liner. However, this machine relies on a continuous motion of the web and the product at preset spacing. The current "tag" industry has products coming at various spacings along the path of the running machine. Also, labels can only be placed in the cross direction of the labels on a carrier web, but there is a need today for labels to be applied at right angles to the direction coming off the carrier web.

U.S. Pat. No. 5,429,576, issued Jul. 4, 1995 to Alfred Doderer-Winkler and assigned to Winkler & Dunnebier of Neuwied, Germany discloses an apparatus for making reusable adhesive envelopes. The envelope comprises a pouch having an opening along one edge, and a top flap adapted to be folded over to close the opening. The apparatus forms the reusable seal and has two spools which mount rolls of material used to form the protective strip having an adhesive layer and adhesive portion. Each strip and adhesive portion is fed by an idle and/or tension roller and then by a metering roller which are located in proximity to an associated anvil roller rotated at a constant common speed. Each anvil roller has an associated cutter roller. The blades of the cutter rollers will sever the tapes to create strips of the tapes corresponding to the final size of the protective strip and adhesive portion. The tape strips are transferred to a placing roller which is located in proximity to the transfer roller and the conveyor means. The tape strips are pressed upon the envelopes at the desired location. However, the constant speed of this machine does not conform to the current standard of the industry. Also, the tape strips cannot be pressure applied at high speeds without skewing the tape strips or moving individual envelopes.

U.S. Pat. No. 5,676,629, issued Oct. 14, 1997 to Ingvar Andersson and assigned to Tetra Laval Holdings & Finance S.A. discloses a method and apparatus for transferring tabs to a continuous material web. The apparatus comprises a rotating wheel with vacuum ducts for holding tabs located between a supply station and a deposit station with vacuum ducts for holding tabs. A groove extends about the periphery of the wheel and accommodates a number of retainer jaws displaced along the periphery of the wheel. When the wheel is rotated the tab is moved into contact with the work surface of one of a plurality of retainer jaws dispersed about the periphery of the wheel, and then that tab is transferred to the web at the deposit station with vacuum ducts for holding tabs on the retainer jaws. However, this is also a continuous motion machine with speeds far too slow for the current industry requirements. Surveillance tags must be applied to continuous or randomly fed articles.

SUMMARY OF THE INVENTION

Accordingly, it is therefore an object of this invention to provide a surveillance tag applicator that applies tags such as electronic article surveillance tags to articles, such as box blanks, blister cards, boxes, or other containers, at a very high rate of speed.

It is another object of the invention to receive a roll of tags attached to a web, thread a leader of the web around a portion of a drum and then to a rewind reel, and transfer each tag on the web to the rotating drum and then to one of a plurality of articles passing by the drum at a very high rate of speed.

It is a further object of this invention to provide a drum to receive tags from a web and apply the tags to articles, the drum having a plurality of slots around the circumference of the drum, each slot being narrower than the width of the tags to provide a pressure fit of the tags in each slot.

It is another object of this invention to provide a first servo motor to drive a rotating drum and a second servo motor to drive a tag ejector arm to enable the tags to be applied to articles at a very high rate of speed under the control of a programmable controller.

It is a further object of this invention to turn the tag applicator assembly comprising the tag transfer drum ninety degrees to enable tags to be applied across the width or along the length of different size articles passing by the indexed rotating drum.

It is yet another object of this invention to provide control to apply tags to every article or to random articles at fixed or variable intervals of advancing articles in accordance with preset controls.

It is another object of this invention to provide three-axis adjustment of a tag transfer drum for proper alignment with articles passing by the drum to receive the tags.

These and other objects are accomplished by an apparatus for high speed application of tags to advancing articles comprising a source of a plurality of tags on a continuous web, a tag transfer drum having a plurality of slots for engaging the plurality of tags on the continuous web as the drum rotates, means for positioning each tag of the plurality of tags into one of the plurality of slots as the tag transfer drum rotates, means for removing the web from the tags secured within the plurality of slots, and means for ejecting each of the plurality of tags onto one of the advancing articles when the advancing articles pass by the rotating drum. The apparatus comprises a rewind assembly positioned adjacent to the web for winding-up the web after removal of the web from the plurality of tags secured in the slots of the drum. The apparatus comprises means for turning the tag transfer drum ninety degrees to enable the tags to be ejected onto the advancing articles either perpendicular to the direction of travel of the advancing articles or parallel to the direction of travel of the advancing articles. The plurality of slots around the circumference of the tag transfer drum comprises means for securing the tag within the slot. The apparatus comprises a sensor for generating a registration control signal upon detection of each of the advancing articles. The apparatus comprises means for controlling the rotating drum and the ejecting of the tags in response to the control signal. The plurality of tags on the continuous web are spaced-apart at equal intervals. The controlling means comprises means for selecting which of the advancing articles receive one of the tags. The apparatus comprises means for leveling the tag transfer drum with respect to a surface of the advancing articles receiving the tags.

The objects are further accomplished by an apparatus for high speed application of tags to advancing articles comprising a source of a plurality of tags on a continuous web, a tag transfer drum having a plurality of slots for engaging the plurality of tags on the continuous web as the drum rotates, a first servo motor having a shaft to which the drum is attached for rotating the drum in predetermined increments, means positioned adjacent to the drum for pressing each tag of the plurality of tags into one of the plurality of slots as the tag transfer drum rotates, means positioned adjacent to the drum for removing the web from the tags secured within the plurality of slots of the drum, means for ejecting each of the plurality of tags onto one of the advancing articles when the advancing articles pass by the rotating drum, and a second servo means having a shaft to which the ejecting means is attached for controlling the ejecting means. The apparatus comprises a sensor for generating a registration control signal upon detection of each of the advancing articles. The apparatus comprises means coupled to the first servo means and the second servo means for controlling the rotating drum and the ejecting of the tags in response to the control signal. The means for removing the web from the tags comprises a rewind assembly for winding the web on a reel. The means for removing the web from the tags comprises a web stripper positioned adjacent to the tag transfer drum whereby the web stripper pulls the web away from the tag secured in the drum as the tag approaches a lower end of the web stripper, and the web moves under the lower end of the web stripper and then away from the web stripper lower end to the web rewind assembly. The web stripper comprises a pair of spaced-apart vertically protruding members on the face of the web stripper facing the tag transfer drum for providing additional pressure on each tag positioned in the slots of the drum to secure each tag in the slots for the high speed application of the tags to the articles. The apparatus comprises means for turning the tag transfer drum ninety degrees to enable the tags to be ejected onto the advancing articles either perpendicular to the direction of travel of the advancing articles or parallel to the direction of travel of the advancing articles in accordance with a predetermined position for the turning means. Each of the plurality of slots around the circumference of the tag transfer drum comprises a pressure fit for holding each of the tags. The plurality of tags on the continuous web are spaced-apart at equal intervals. The controlling means further comprises means for selecting which of the advancing articles receives one of said tags. The apparatus comprises means for leveling the tag transfer drum with respect to a surface of the advancing articles receiving one of the tags.

The objects are further accomplished by a method of applying tags at high speed to advancing articles comprising the steps of supplying a plurality of tags on a tag carrier web to a tag transfer drum, engaging the tag carrier web on the tag transfer drum with means for placing each of the plurality of tags into one of a plurality of slots around the circumference of the tag transfer drum, rotating the drum to engage a next one of the plurality of tags in a next slot of the drum, extending at least one ejector finger into a groove around the circumference of the drum, removing the web from each of the tags secured into the slots as the drum is rotated, and ejecting each of the tags onto an advancing one of the articles with the ejector finger. The method comprises the step of winding-up the web removed from the tags on a reel as the drum is rotated. The method comprises the step of turning the tag transfer drum ninety degrees to enable the tags to be ejected onto the advancing articles either perpendicular to the direction of travel of the advancing articles or parallel to the direction of travel of the advancing articles. The step of engaging the tag carrier web and the tag transfer drum by means for pressing each of the tags into one of the plurality of slots around the circumference of the tag transfer drum comprises the step of providing a pressure fit in each of the slots for securing each of the tags within the slots. The method comprises the step of providing a web stripper positioned adjacent to the tag transfer drum whereby the web stripper pulls the web away from each of the tags as the tags approach a lower end of the web stripper and the web travels under the lower end of the web stripper and to a web rewind assembly. The step of providing a web stripper comprises the step of providing a pair of spaced-apart vertical protruding members on the face of the web stripper adjacent to the tag transfer drum for providing an additional pressure on each tag positioned in the slots of the drum to secure the tags in the slots. The method comprises the step of providing a sensor for generating a control signal upon detection of each of the advancing articles. The method comprises the step of providing a controller for controlling the rotation of the drum following transfer of one of the tags in the slots of the drum onto the advancing articles in response to the control signal. The step of providing a controller comprises the step of selecting which ones of the advancing articles receive one of the tags. The method comprises the step of leveling the tag transfer drum to be parallel to a surface of the advancing articles receiving one of the tags.

The objects are further accomplished by a method of applying tags at high speed to advancing articles comprising the steps of supplying a plurality of tags on a tag carrier web to a tag transfer drum, engaging the tag carrier web on the tag transfer drum with means for pressing each of the plurality of tags into one of a plurality of slots around the circumference of the tag transfer drum, providing a first servo means having a shaft to which the tag transfer drum is attached for rotating the drum in predetermined increments, generating a sensor signal upon detection of each of the advancing articles approaching the drum, removing the web from the tags secured within the plurality of slots of the drum with a web stripper which provides a secondary pressure on the tags in the slots, winding the web devoid of the tags on a reel, extending at least one ejector finger of an ejecting means into a groove around the circumference of the tag transfer drum, providing a second servo means having a shaft on which the ejecting means is attached for controlling the ejector finger, ejecting each of the tags on the drum onto one of the advancing articles with the ejector finger, and controlling the rotation of the drum and the ejecting means in response to the sensor signal with a programmable controller coupled to the first servo means and the second servo means. The method comprises the step of turning the tag transfer drum ninety degrees to enable the tags to be ejected onto the advancing articles either perpendicular to the direction of travel of the advancing articles or parallel to the direction of travel of the advancing articles. The method comprises the step of leveling the tag transfer drum to be parallel to a surface of each of the advancing articles receiving one of the tags.

Additional objects, features and advantages of the invention will become apparent to those skilled in the art upon consideration of the following detailed description of the preferred embodiment exemplifying the best mode of carrying out the invention as presently perceived.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
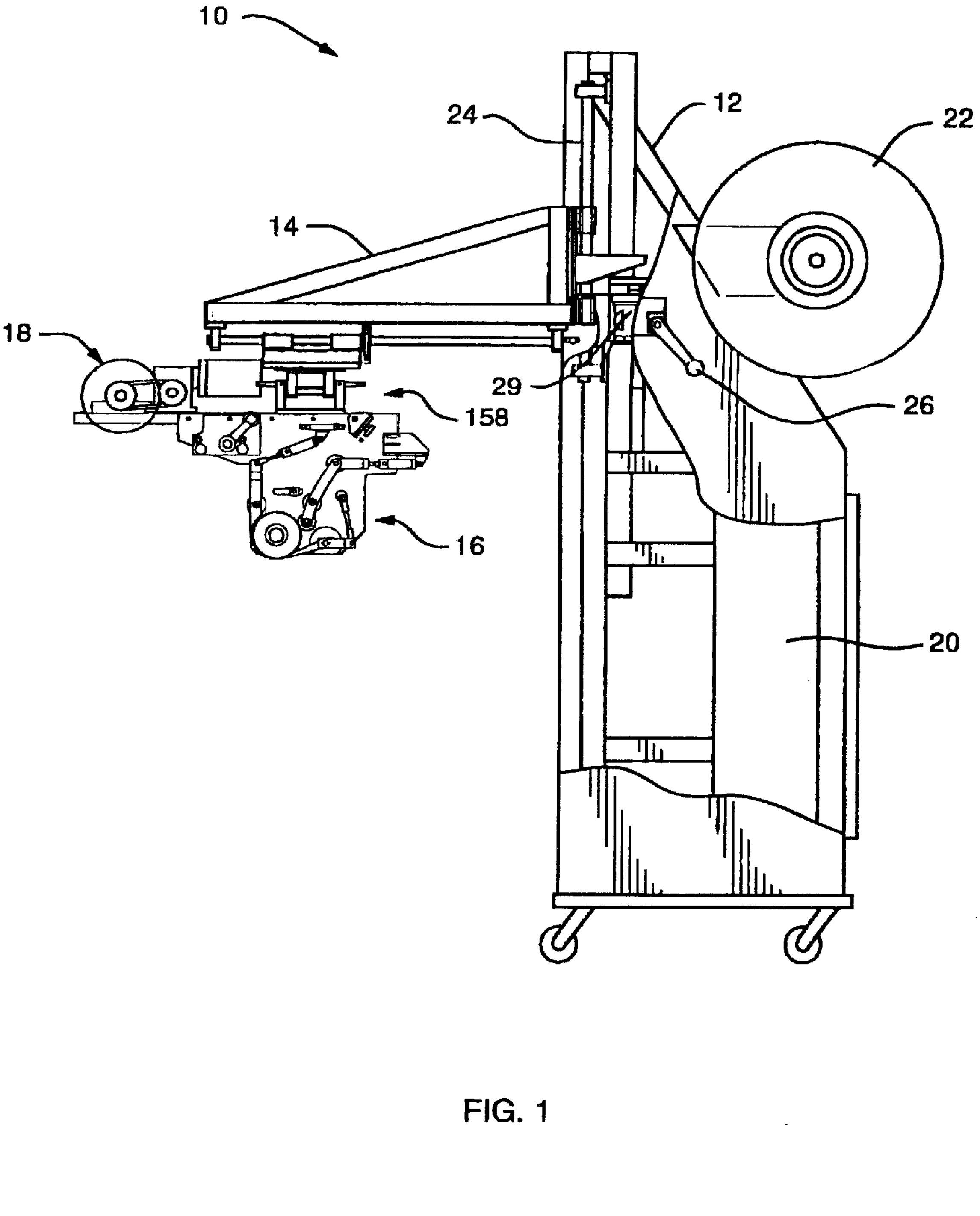
FIG. 1 is a side elevational view of the invention of a surveillance tag applicator apparatus.

Referring to FIG. 1, a side elevational view of the invention of a surveillance tag applicator 10 is shown comprising a frame assembly 12, an adjustable frame assembly 14, an applicator assembly 16 and a rewind assembly 18. Also located within the main frame assembly 12 is a programmable controller 20 for controlling the operation of the surveillance tag applicator 10.

High Speed Tag Applicator

Figure 7:
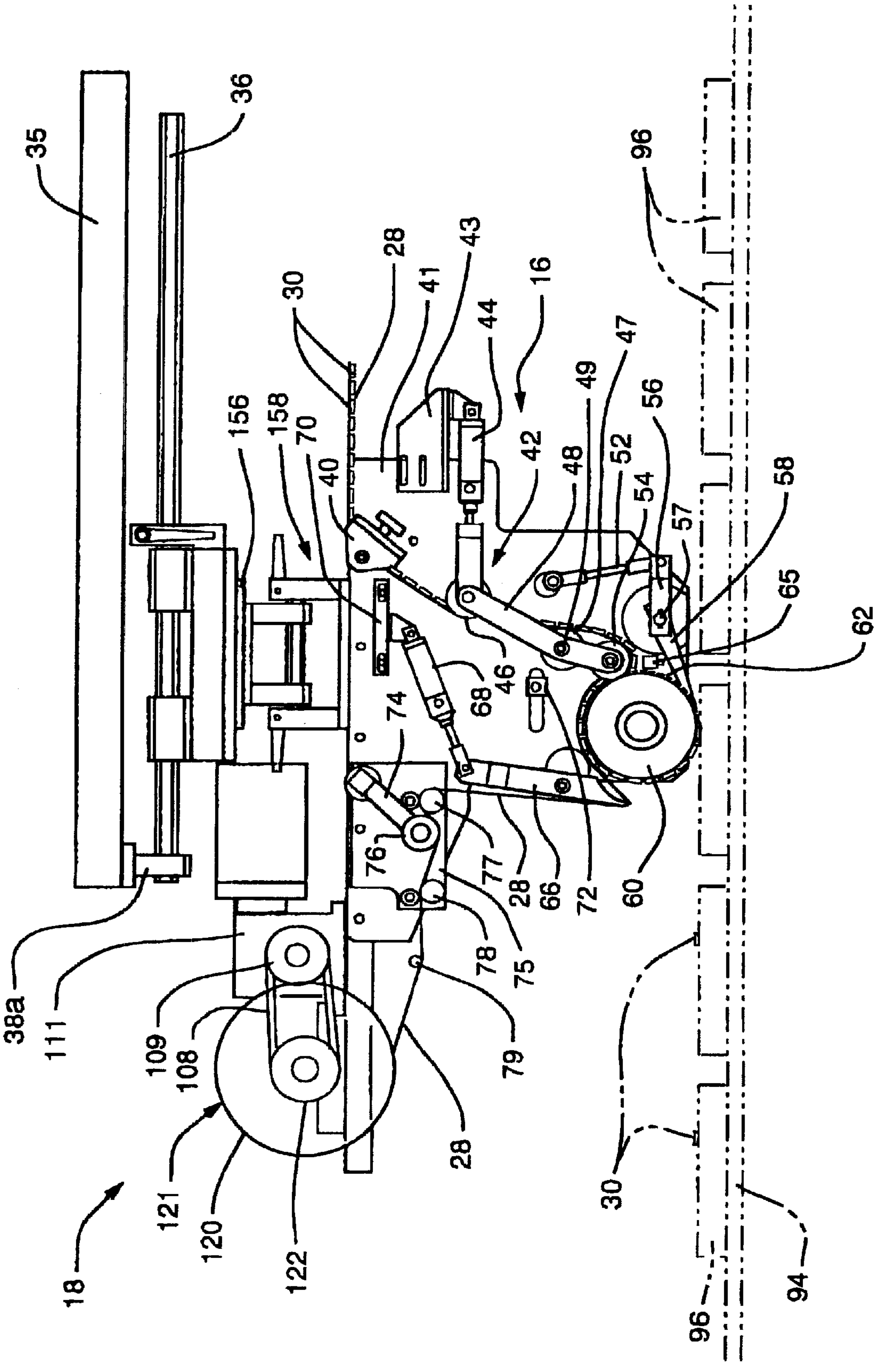
FIG. 7 is an elevational view of the rewind assembly and the tag applicator assembly showing a web of tags threaded through the assemblies for applications of tags to articles passing by the drum on a conveyor.

Still referring to FIG. 1 and also FIG. 7, FIG. 7 shows an elevational view of the applicator assembly 16 and the rewind assembly 18 with a web 28 of tags 30 threaded through the assemblies 16, 18 for application of the tags 30 to articles 96 passing by a drum 60 on a conveyor 94. The tags 30 are attached to the web 28 with an adhesive which enables attachment of the tags 30 to the articles 96. As best seen in FIG. 7, the surveillance tag applicator 10 applies surveillance tags 30 such as Electronic Article Surveillance (EAS) tags to articles 96 such as box blanks, blister cards, packages, boxes or containers of many different varieties moving by the applicator 10 on the conveyor 94 at fixed intervals or variable intervals. A significant feature of this invention is that a plurality of tags 30 can be applied to receiving articles 96 such as box blanks, blister cards, or other containers at speeds greater than 1000 tags per minute. Also, tags 30 may be applied to continuous equally spaced or randomly spaced articles 96, or may be applied to preselected advancing articles 96.

Frame Assembly

Figure 8:
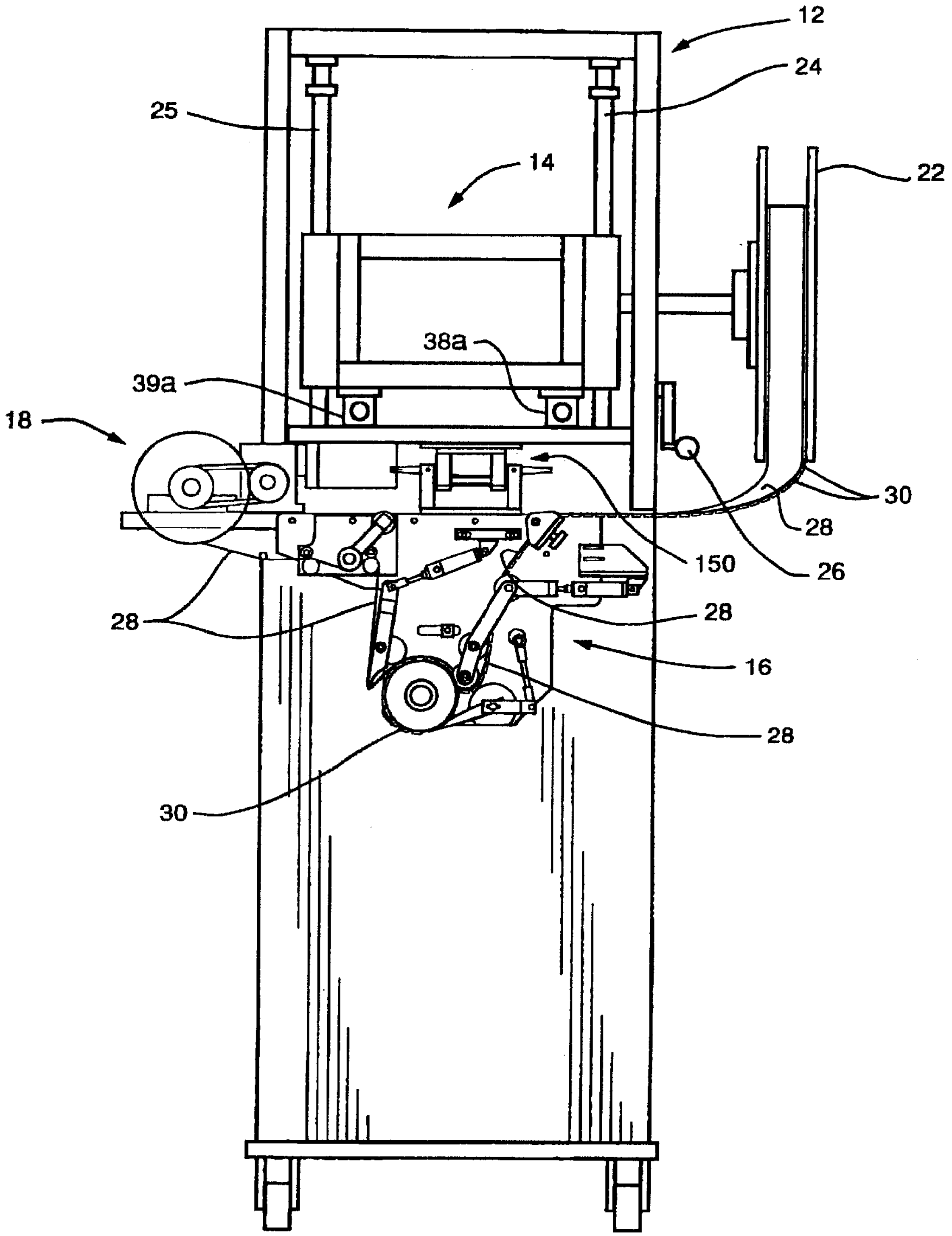
FIG. 8 is a front elevational view of the surveillance tag applicator apparatus of FIG. 1 with the tag applicator assembly and the rewind assembly turned ninety degrees from the position in FIG. 1.

As best seen in FIG. 1, FIG. 7 and FIG. 8, the frame assembly 12 is the main support and enclosure for the surveillance tag applicator 10. FIG. 8 is a front elevational view of the tag applicator 10 of FIG. 1 with the applicator assembly 16 and the rewind assembly 18 turned ninety degrees from their position in FIG. 1. A reel 22 having a plurality of tags 30 attached to a continuous web 28 is mounted on a side of the main frame assembly 12, and the web 28 of tags 30 is fed to the applicator assembly 16 and then the web 28 devoid of tags 30 travels to the rewind assembly 18. The frame assembly 12 comprises vertical bars 24, 25 for enabling the adjustable frame assembly 14 to move up and down to accommodate various heights of articles 96 passing by tag transfer drum 60.

Figure 9:
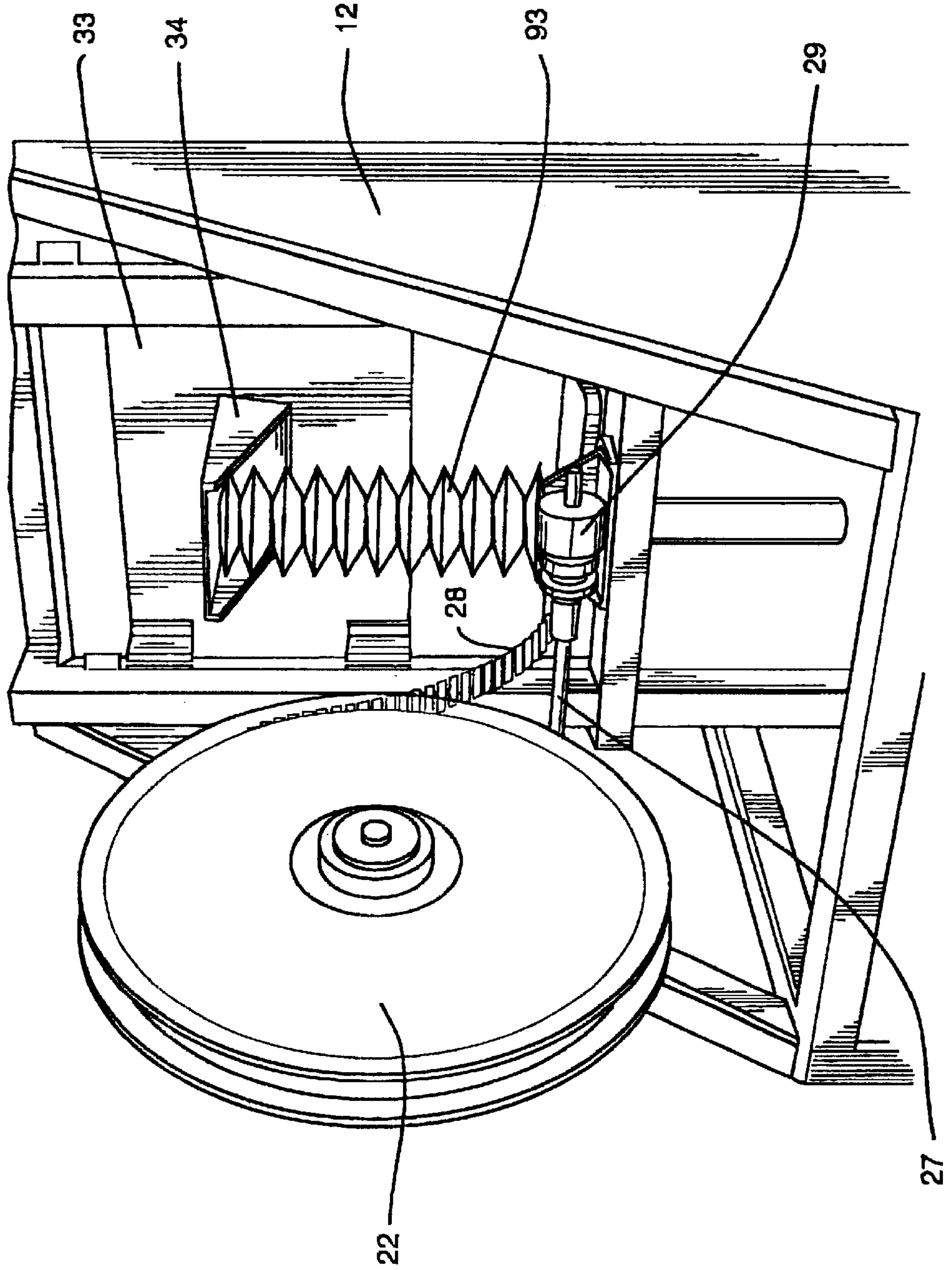
FIG. 9 is a perspective rear view of an upper portion of the frame assembly of the surveillance tag applicator apparatus showing a jack screw extending from a worm gear assembly which drives the jack screw for raising and lowering the adjustable frame assembly of FIG. 1.

Referring now to FIG. 8 and FIG. 9, FIG. 9 shows a perspective rear view of an upper portion of the frame assembly 12 of the surveillance tag applicator 10 comprising the reel 22, which feeds the web 28 of tags 30 to the applicator assembly 16 and a jack screw 93 controlled by the worm gear assembly 29. When the crank handle 26 (FIG. 1) on the side of the frame assembly 12 is rotated, it turns the shaft 27 connected to the worm gear assembly 29 which drives the jack screw 93. The top of the jack screw 93 is attached to the jack weldment 34 extending from the rear of the adjustable frame assembly 14. The jack screw 93 raises and lowers the adjustable frame assembly 14 to which the applicator assembly 16 is attached.

Applicator Assembly

Figure 2:
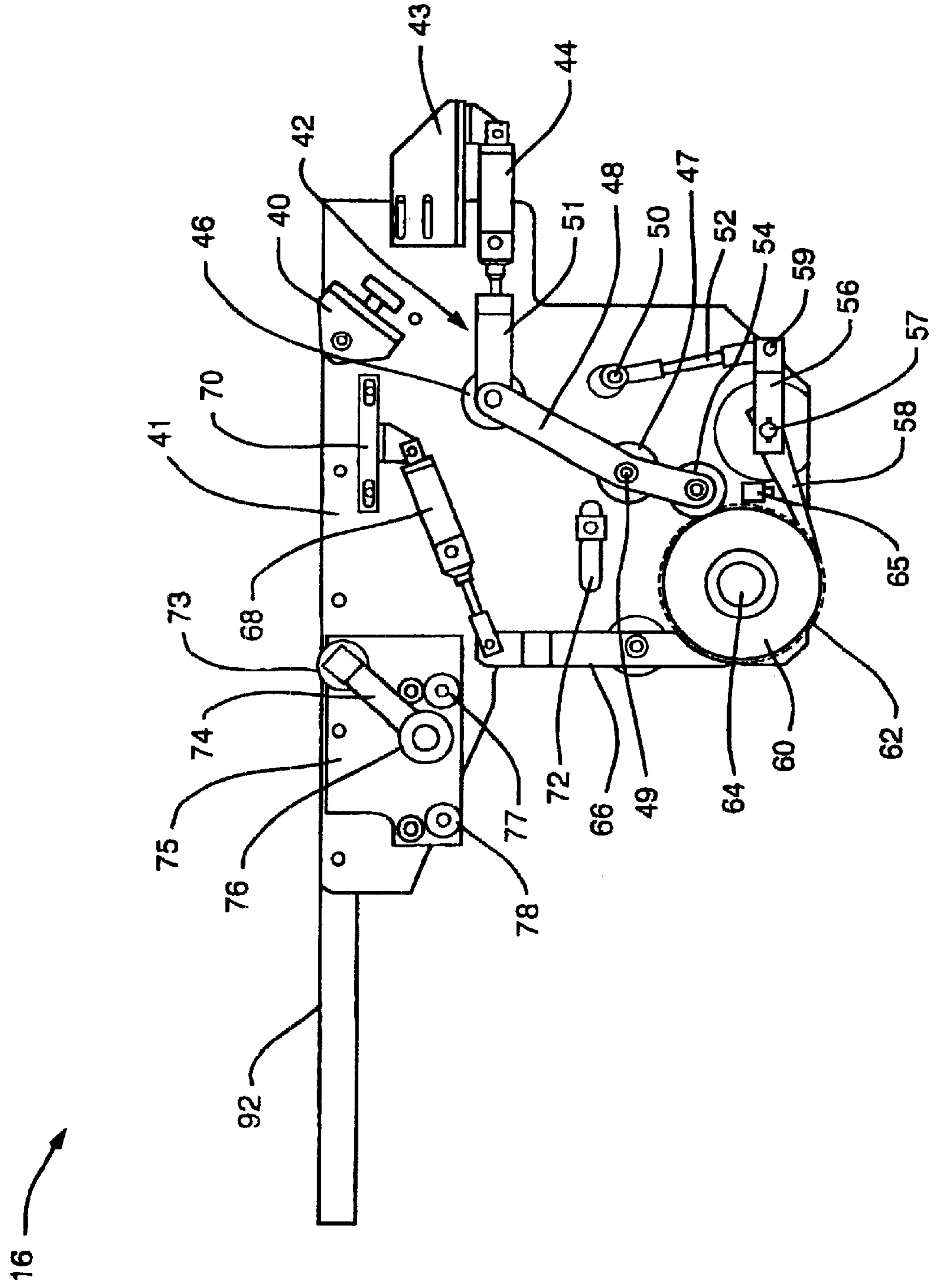
FIG. 2 is a front elevational view of a tag applicator assembly.

Referring to FIG. 2 and FIG. 7, FIG. 2 shows a front elevational view of the tag applicator assembly 16. The applicator assembly 16 comprises the tag transfer drum 60 comprising a total of 24 slots 62 around the circumference of the drum 60. A photo sensor 65 is mounted adjacent to the drum 60 for sensing the leading edge of an article 96 which is to receive a tag 30. A tag inserter assembly 42, attached to a mounting panel 41, comprises at one end a tag inserter cylinder 44, an inserter rod 51 extending therefrom and attached to one end of a tag inserter arm 48. The tag inserter arm 48 comprises a top roller 46 positioned on the top portion of the tag inserter arm 48 at the junction with the inserter rod 51 and a bottom roller 54 positioned on the lower end of the tag inserter arm 48. A guide roller 47 is located above the bottom roller 54 approximately at a point where the tag inserter arm 48 bends at an angle of approximately 15 degrees toward the tag inserter rod 51. Guide roller 47 and tag inserter arm 48 are attached to mounting panel 41 by means of a shoulder bolt 49. The shoulder bolt 49 allows tag inserter arm 48 to pivot about the shoulder bolt 49. The tag inserter cylinder 44 is an air cylinder which attaches to a lower portion of a roll cylinder mount 43. When the tag inserter cylinder 44 is actuated by providing air to the inserter cylinder 44, the tag inserter arm 48 pivots at the point of the guide roller 47 location and the bottom roller 54 presses a tag into the slot 62 on the drum 60.

Figure 3:
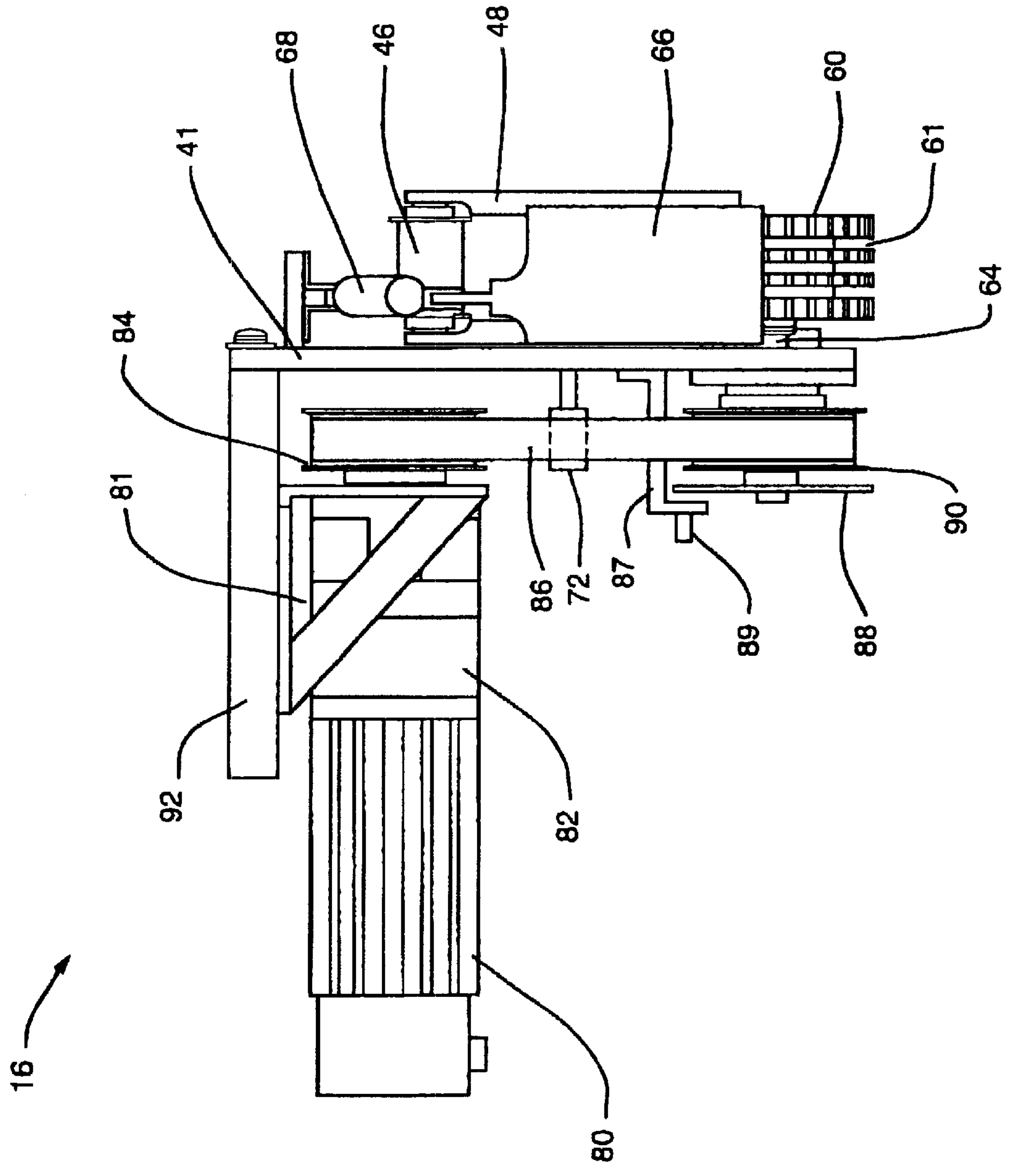
FIG. 3 is an end view of the tag applicator assembly of FIG. 2.

Still referring to FIG. 2, FIG. 3 and FIG. 7, a tensioner 40 is attached to an upper portion of the mounting panel 41 for receiving the web 28 of tags 30 and providing the proper tension on the web 28 between the tensioner 40 and the tag transfer drum 60. The tensioner 40 may be embodied by a housing comprised of one fixed plate and one moveable plate attached to a thumb screw through which the web 28 passes. The thumb screw is tightened or loosened to keep the web 28 at the proper tension level so as not to create slack between the tensioner 40 and the inserter roller 54. The tensioner 40 compensates for the high speed movement of the drum servo motor 80. Otherwise the tags 30 tend to pull away from the drum 60 when the web 28 tension becomes loose. Also, a timing belt tensioner 72 is attached to the mounting panel 41 adjacent to the guide roller 47 of the tag inserter arm 48. The timing belt 86 is located behind mounting panel 41. The timing belt tensioner 72 maintains tension on the timing belt 86 to insure that the drum timing stays correct.

Still referring to FIG. 2, a web stripper 66 is attached to the mounting panel 41 above the left side of the drum 60 so that the lower end of the web stripper 66 comes into close proximity with the circumference of the drum 60 as the web 28 is removed from each tag 30 secured in slots 62 of the drum 60. The upper end of the web stripper 66 attaches to a rod end of a stripper cylinder 68 and the other end of the stripper cylinder 68 is attached to a stripper cylinder mount 70.

Figure 19:
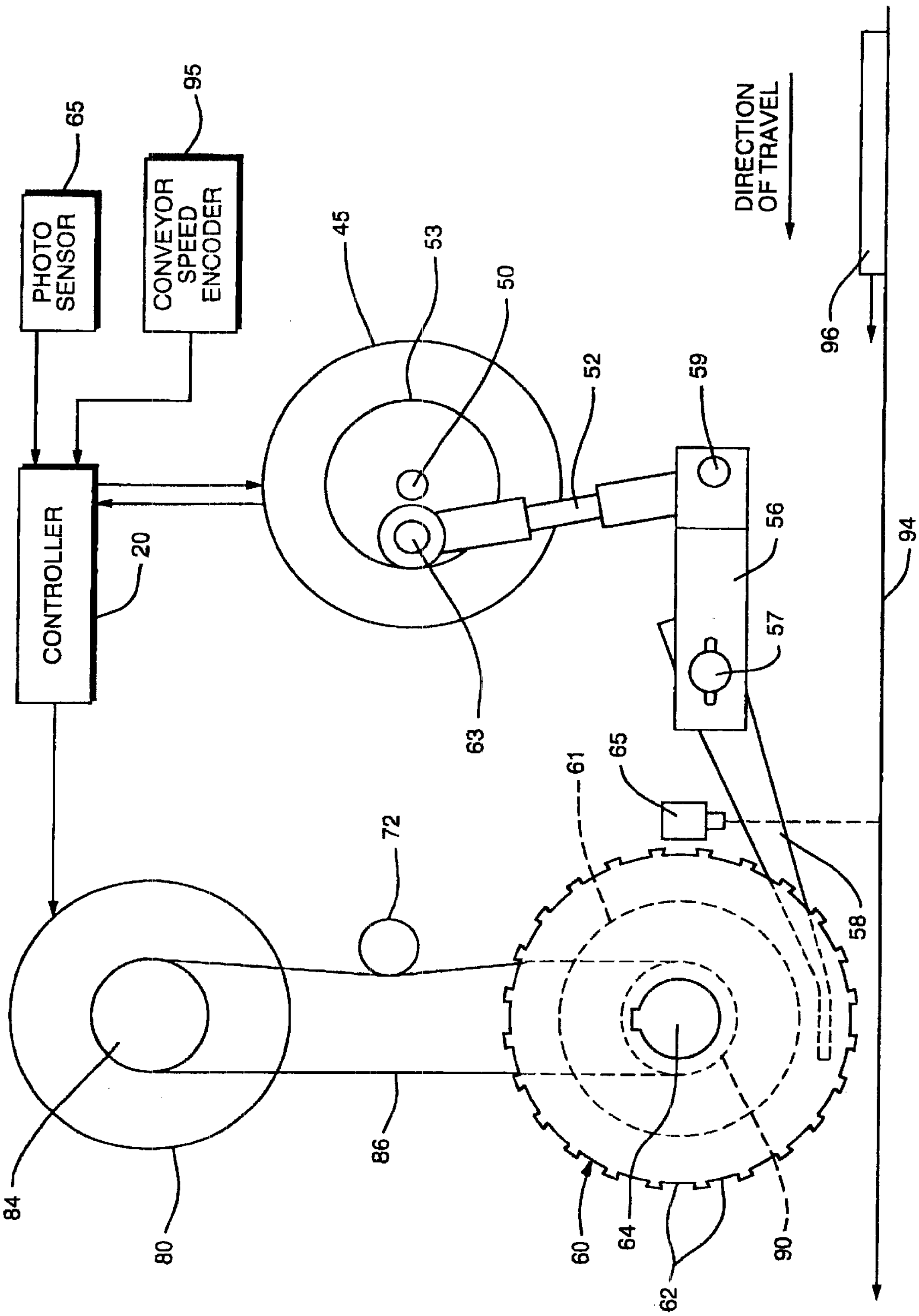
FIG. 19 is a diagram showing an ejector finger servo motor for controlling the ejector fingers arm and the drum servo motor for controlling the drum indexing, both servo motors operating under the control of a programmable controller.

As best seen in FIGS. 2 and 19, FIG. 19 shows an ejector finger servo motor 45 for controlling an ejector fingers arm 58. The ejector fingers arm 58 is mounted to a pivot shaft 57 adjacent to the photo sensor 65 and an ejector lever 56 connects to the pivot shaft 57 at one end, and a lower end pivot pin 59 of an ejector rod 52 connects to the other end of ejector lever 56. The upper end of the ejector rod 52 attaches to an eccentric drive shaft 53 at pivot pin 63. Eccentric drive shaft 53 attached to and is driven by servo motor shaft 50.

Referring again to FIG. 2 and FIG. 7, a tension plate 75 is attached to the mounting panel 41 in the upper left corner. A pair of idler rollers 77, 78 are mounted, spaced-apart and parallel to each other near the lower edge of the tension plate 75. One end of a web film tensioner arm 74 is mounted to a torsional spring element 73 which in turn is mounted to an upper right corner of the tensioner plate 75 and the lower end of the web film tensioner arm 74 is attached to roller 76.

Referring to FIG. 3, an end view of the tag applicator assembly 16 is shown. A servo motor 80 is mounted to a bracket 81 which is attached to a side frame 92 of the applicator assembly 16, and the servo motor 80 is connected to a gear box 82 having a pulley wheel 84 extending therefrom toward the mounting panel 41. A timing belt 86 is mounted around the pulley wheel 84 and extends to a second pulley wheel 90, which is attached to the mounting panel 41. A timing belt tensioner 72 extends from the mounting panel 41 and is adjusted to maintain tension on the timing belt 86. The second pulley wheel 90 has a shaft 64 which extends through the mounting panel 41 for mounting of the drum 60 on the shaft 64 on the front side of the mounting panel 41. A drum sensor wheel 88 is mounted on the side of the pulley wheel 90 and a photo sensor 89 is mounted on a bracket 87 extending from the rear of the mounting panel 41. The photo sensor 89 is positioned to monitor 24 holes around the outer edge of the drum sensor wheel 88 (i.e. one hole on the drum sensor wheel 88 for each slot 62 around the drum 60). On the front side of the mounting panel 41 is the stripper cylinder 68 and the tag guide top roller 46 positioned within the tag inserter arm 48. The tag transfer drum 60 comprises three grooves 61 around the perimeter of the drum 60 for receiving the fingers 186, 187, 188 of the ejector fingers arm 58 (see FIG. 17).

Rewind Assembly

Figure 4:
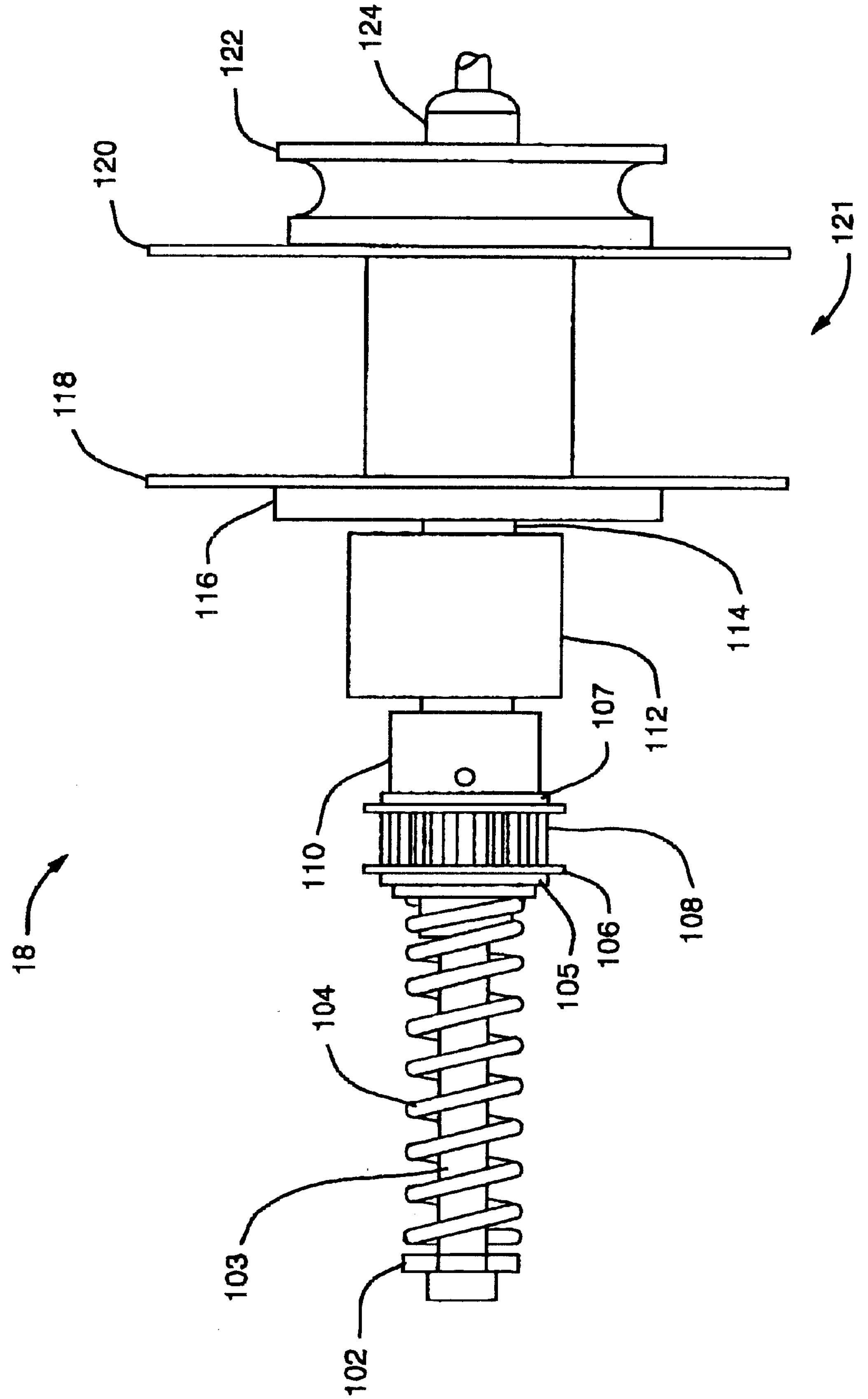
FIG. 4 is a front elevational view of a rewind assembly.

Referring to FIG. 4 and FIG. 7, FIG. 4 shows a front elevational view of the rewind assembly 18 and FIG. 7 shows a side view of the rewind assembly 18. The rewind assembly 18 comprises a timing pulley 106 which is driven by a timing belt 108. The timing belt 108 is mounted around another pulley 109 which is driven by a motor 111. A spring 104 extends from a left side of the timing pulley 106 and has a spring retainer 102 attached to a shaft 103 extending through the center of the spring 104 which provides a slip clutch adjustment to keep proper windup tension on the web 28 now devoid of tags 30. Friction elements 105, 107 are positioned on each side of the pulley 106 for transferring torque. A spacer 110 is positioned between the timing pulley 106 and a bearing block 112. A shaft 114 extends from a rewind reel 121 side of the bearing block 112 for receiving the rewind reel 121 which comprises a fixed backing plate 118 and a removable backing plate 120. On the outside of the removable backing plate 120 is a rewind hub 122 with a spring tension adjustment knob 124 fitted on the end of the shaft 114 to hold the rewind hub 122 and reel 121 on the shaft 114. A mounting disk 116 provides back support for the rewind reel 121 and is positioned between the bearing block 112 and the fixed backing plate 118. The rewind reel 121 winds-up the web 28 after the web 28 is separated from the tags 30 secured in slots 62 of the drum 60.

Adjustable Frame Assembly

Figure 5:
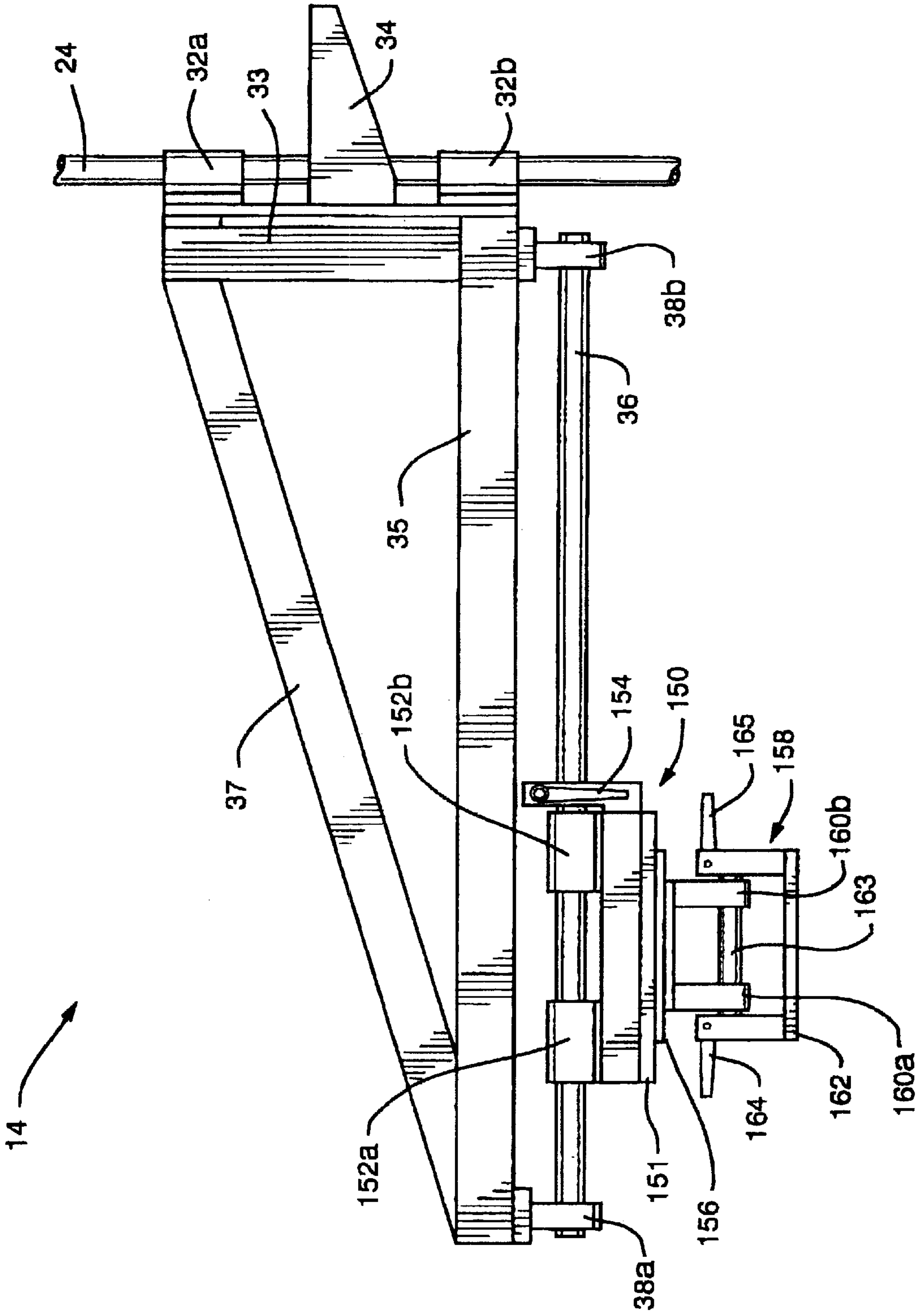
FIG. 5 is a side elevational view of an adjustable frame assembly.
Figure 6:
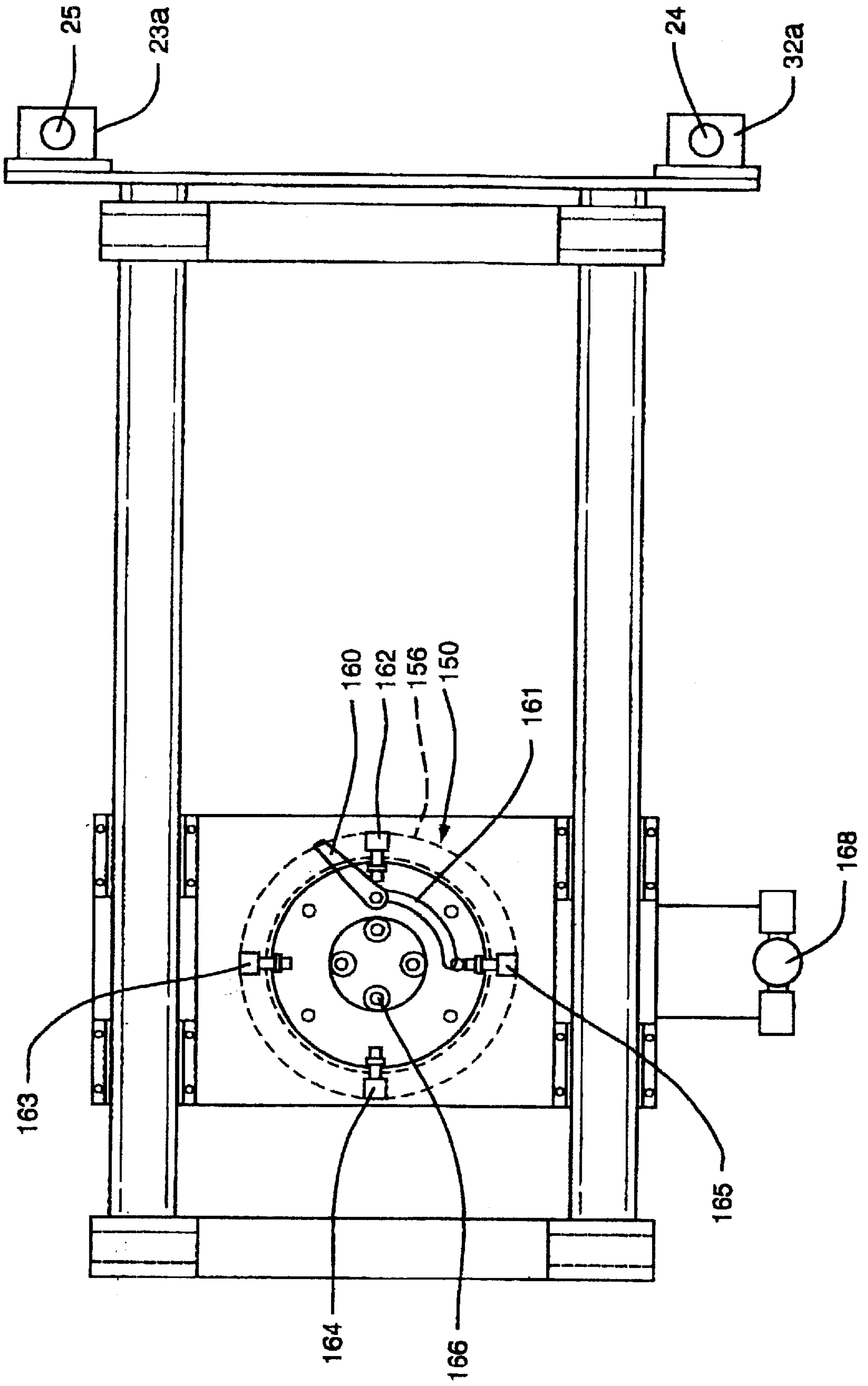
FIG. 6 is a top view of a turntable mechanism for rotating the tag applicator assembly and rewind assembly 90 degrees.
Figure 18:
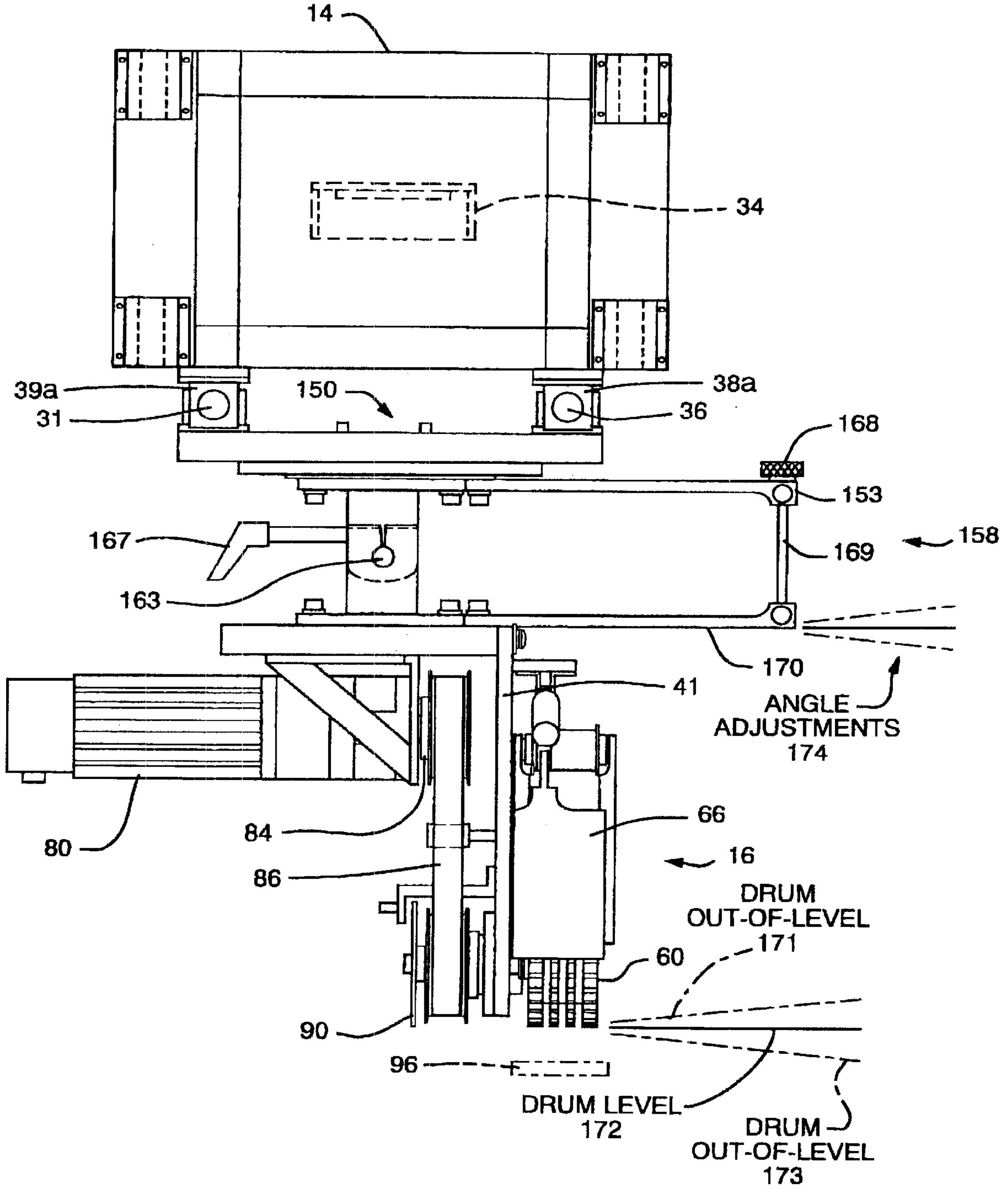
FIG. 18 is a diagram showing the leveler assembly attached under the turntable assembly for leveling the tag transfer drum relative to the top surface of an article passing by the drum.

Referring to FIGS. 5, 6 and 18, FIG. 5, is a side elevational view of the triangular shaped adjustable frame assembly 14 comprising sections 33, 34 and 35. Rod supports 32*a,* 32*b* and 23*a*, 23*b* (on the opposite side) extend from the ends of the vertical section 33 into which the vertical bars 24, 25 of the frame assembly 12 are inserted. The adjustable frame assembly 14 moves up and down the vertical bars 24, 25 in accordance with the operation of the worm gear assembly 29 mounted within the frame assembly 12 (see FIG. 9).

Still referring to FIG. 5 and FIG. 18, extending below both sides of the horizontal section 35 of the adjustable frame assembly 14 are pairs of shaft supports 38*a,* 38*b* and 39*a,* 39*b* which support the shafts 31, 36 at each of their ends. A turntable assembly 150 is attached to the shafts 31, 36 on each side of the horizontal section 35 by means of shaft supports 152*a* and 152*b* through which shaft 36 passes and shaft supports 151*a* and 151*b* on the opposite side (not shown) of the adjustable frame assembly 14 through which shaft 31 passes. Adjacent to each of the shaft supports 151*b* and 152*b* are adjustable clamping handles 154, 155 (not shown) for securing the turntable assembly 150 at various points along shafts 36 and 31 respectively. This adjustment permits positioning of the applicator assembly 16 over various size article conveyors 94 or transport units such as folder gluers or the like from various manufacturers. An angled section 37 on each side of the adjustable frame assembly 14 supports the vertical section 33 and the horizontal section 35. Sections 33, 35 and 37 are typically welded together.

Still referring to FIGS. 5 and 18, FIG. 18 shows a drum leveler assembly 158 attached under the turntable assembly 150 for leveling the tag transfer drum 60 relative to the top surface of an article 96 passing under the drum 60. The drum leveler assembly 158 comprises two vertical supports 160*a* and 160*b* extending downward from the turntable 156 for supporting a shaft 163 extending through each of the bars 160*a*, 160*b* and into the sides of a pivot bracket 162. Adjustable clamping handles 164, 165 are attached to the upper ends of the pivot bracket 162 for fixing the drum leveler 158 at various positions for leveling the drum 60 with respect to the surface of articles receiving tags 30 to enable reliable high speed operation of the surveillance tag applicator 10.

Referring now to FIG. 6, FIG. 7 and FIG. 18, FIG. 6 shows a top view of the turntable 156 for rotating the tag applicator assembly 16 and the rewind assembly 18 ninety degrees which enables tags 30 to be applied either across the width (in-flow) or along the length (cross-flow) of different size articles 96 moving on a conveyor 94. A groove 161 in the turntable 156 permits the turntable 156 to turn about an adjustable rotation clamp 160 which secures the turntable in a preferred position. Cam followers 162–165 provide guidance for turning of the turntable 156. Four mounting bolts 166 secure the turntable 156 to the leveler assembly 150. FIG. 18 shows the leveling assembly 158 attached under the turntable assembly 150 for leveling the tag transfer drum 60 with respect to the surface of the article 96. A knob 168 located on top of a rod 169, which is attached to a fixed plate 153 and adjustable plate 170 extending from below the turntable 156, provides for adjusting the drum leveler assembly 158 in order to level the drum 60 with respect to the top surface of the article 96 receiving a tag 30. Adjusting the knob 168 raises or lowers adjustable plate 170 resulting in angle adjustments 174 to the leveler assembly 158. Therefore, the drum 60 mounted on the applicator assembly 16 is likewise adjusted whereby the drum level 172 is adjusted to bring the drum 60 parallel with the surface of the article 96 as shown in FIG. 18.

Rewind Assembly and Applicator Assembly

Referring to FIG. 7, this elevational view of the rewind assembly 18 and the applicator assembly 16 shows the web 28 comprising tags 30 threaded through the assemblies 16, 18 for transfer of the tags 30 to articles 96 passing by on a conveyor 94 adjacent to the bottom of the drum 60. The web 28 is fed through the tensioner 40 and then over the top roller 46 of the tag inserter assembly 42. The web 28 then passes through the tag inserter arm 48 and under the bottom roller 54 at the lower end of the tag inserter arm 48. The web 28 passes over the top of the drum 60 with the tag side of the web 28 facing the slot 62 of the drum 60. The bottom compression roller 54 of the tag inserter arm 48 presses each tag 30 into one of the twenty-four slots 62 around the circumference of the drum 60. The tag 30 remains attached to the web 28 until the drum 60 rotates approximately 120 degrees, and then the web stripper 66 separates the tag 30 from the web 28; then the web 28 is directed to the rewind assembly 18. The web 28 proceeds toward and around the idler roller 77 and under tensioner roller 76 on the end of the web tensioner arm 74. Then the web 28 proceeds over a idler roller 78 and under a web guide rod 79 attached to the side of the applicator assembly 16. The web 28 continues on to the rewind reel 121 which is rotated by motor 111 thereby winding the web 28 around the rewind reel 121. When the web 28 is being threaded through the applicator assembly 16, the tag inserter cylinder 44 moves the tag inserter arm 48 whereby the compression roller 54 is moved away from the drum 60. Likewise, the stripper cylinder 68 moves the web stripper 66 away from the drum 60. Manual air selector switches (not shown but commonly known in the art) are turned-on to actuate the tag inserter cylinder 44 and the stripper cylinder 68 during the initial web 28 threading set-up operation.

Applicator Assembly Turned Ninety Degrees

Referring to FIG. 8, a front elevational view of the surveillance tag applicator 10 of FIG. 1 is shown with the tag applicator assembly 16 and the rewind assembly 18 turned ninety degrees from the position shown in FIG. 1 by means of the turntable assembly 150. This important feature allows tags 30 from reel 22 to be applied either across the width (in-flow) or along the length (cross-flow) of different size articles 96 moving on the conveyor 94 (FIG. 7). The position of the applicator assembly 16 in FIG. 8 would apply the tags 30 across the width of the article 96 (in-flow direction) passing under the drum 60 from right to left.

Web Stripper

Figure 11:
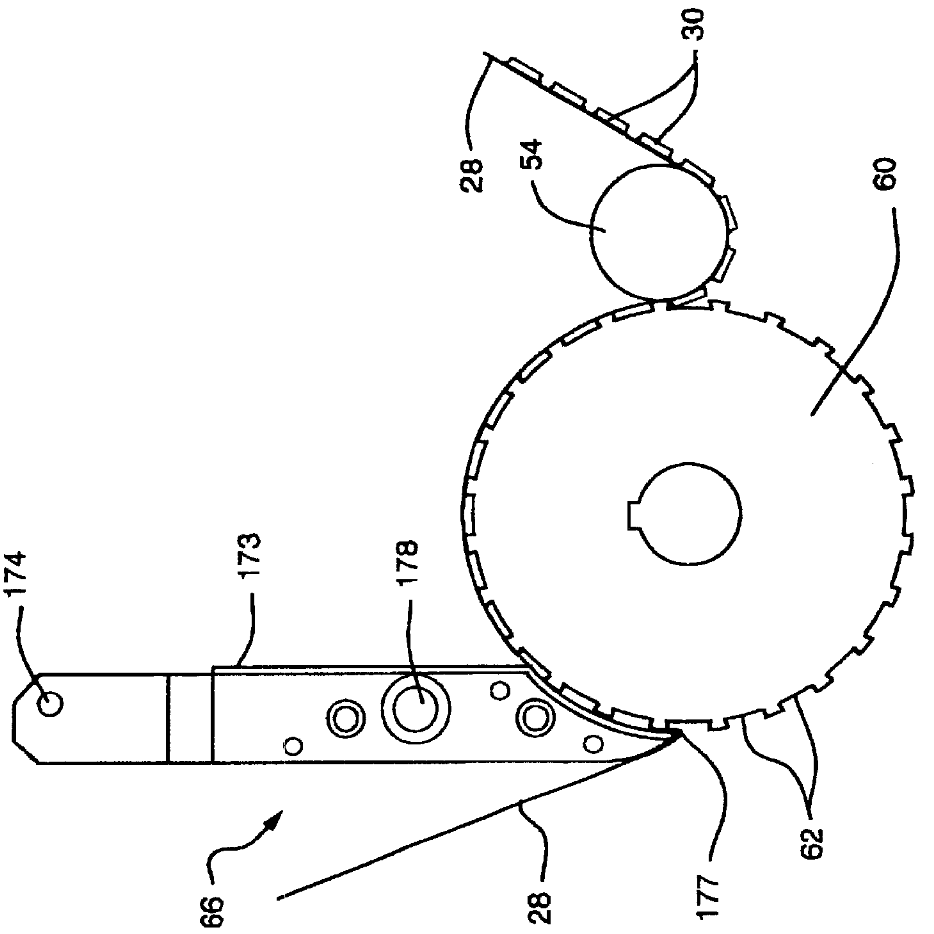
FIG. 11 is a side elevational view of the web stripper of FIG. 10 positioned adjacent to the tag transfer drum receiving tags on a web.
Figure 10:
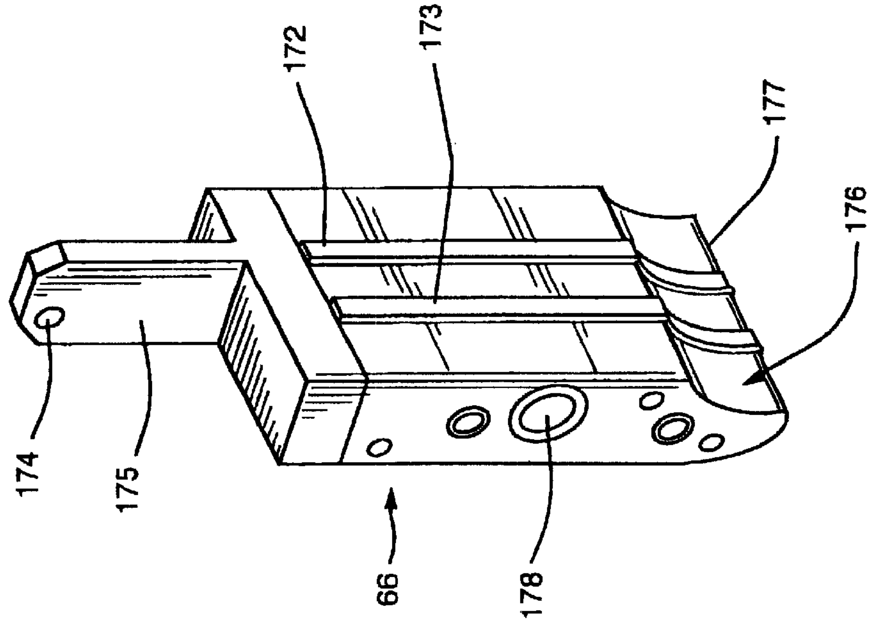
FIG. 10 is a perspective view of a web stripper.

Referring now to FIG. 7, FIG. 10 and FIG. 11, FIG. 10 shows a perspective view of the web stripper 66 and FIG. 11 is a side elevational view of the web stripper 66 positioned adjacent to the tag transfer drum 60 which receives tags 30 attached to the web 28. The web stripper 66 is attached to the stripper cylinder 68 by a bolt through a hole 174 in the handle 175 portion, and the web stripper 66 is attached to the mounting panel 41 by a bolt via hole 178 in the side of the web stripper 66. The web stripper 66 is made of plastic to minimize wear at the bottom edge 177 where the web 28 separates from the tags 30 and travels under edge 177. The web 28 then travels toward the rewind assembly 18. After tags 30 are positioned in slots 62 of the tag transfer drum 60 and as the drum 60 rotates past web stripper 66, the web 28 is pulled away from the drum 60 by the web stripper 66 thereby separating the web 28 from the tags 30 which are secured in slots 62. On the face of the web stripper 66 are two protruding vertically positioned strips of plastic 172, 173 which provide additional pressure on the tags 30 after the tags 30 have been inserted into slots 62 of the drum 60 by compression roller 54 to insure that the tags 30 are securely within the slots 62. The concave curvature area 176 at the lower end of the web stripper 66 is similar to the curvature of the drum 60 which enables the edge 177 of the web stripper 66 to get close to the tag transfer drum 60 in order to provide additional pressure on the tags 30 in slots 62 to insure maximum stripping effectiveness, i.e. 180 degrees stripping of the web 28 from the direction of travel is the optimum.

Tag Transfer Drum

Figure 13:
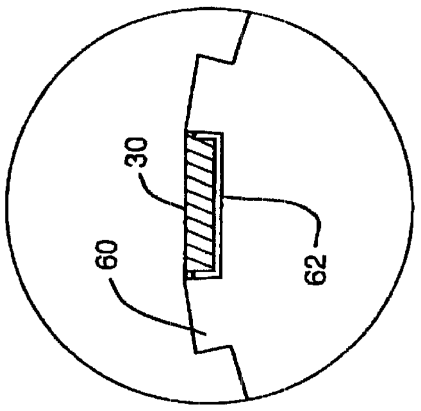
FIG. 13 is an enlarged detail view of the slot area shown in FIG. 12 with a surveillance tag secured in the slot.
Figure 12:
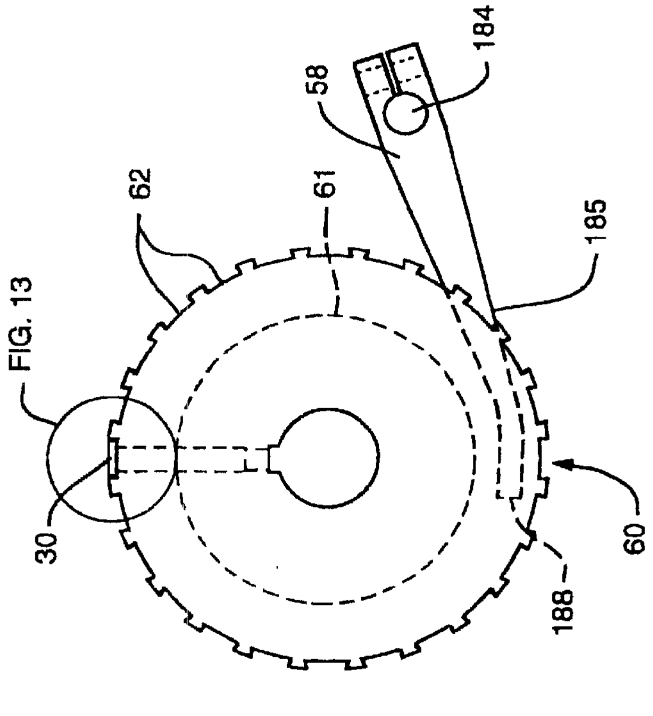
FIG. 12 is a side elevational view of a tag transfer drum having a plurality of slots for receiving tags and grooves for receiving ejector fingers.

Referring to FIG. 12 and FIG. 13, FIG. 12 is a side elevational view of the indexing tag transfer drum 60, comprising a plurality of slots 62 around the periphery of the drum 60 for holding tags 30. In the present embodiment the drum 60 comprises twenty-four slots 62. The diameter of the drum 60 is 4.4 inches and the width of the drum 60 is 2.25 inches; the width at the entrance to slot 62 is 0.392 inches and the width at the base of the slot 62 is 0.400 inches. The above dimensions accommodate a sensor tag 30, such as Model ULTRA STRIP III, manufactured by Sensomatic of Boca Raton, Fla., and measuring 0.40 inches wide, 1.76 inches long and 0.059 inches high. However, various other size drums 60, slots 62, and tags 30 may be employed for use in the tag applicator 10 (FIG. 1) with the drum 60 being appropriately modified to accommodate other tag sizes. Three grooves 61 are provided in the preferred embodiment around the periphery of the drum 60 perpendicular to the plurality of slots 62 for insertion of the ejector fingers 186–188 of ejector fingers arm 58 (see FIG. 17) within such grooves 61. However, the number of grooves 61 in the drum 60 may be varied. FIG. 13 is an enlarged detail view of the slot 62 with a surveillance tag 30 secured in the slot 62 showing the width of the slot 62 at the entrance to the slot 62 is narrower than the width at the base of the slot 62 due to the angled sides of the slot 62. This feature provides a more secure hold on the tags 30 especially during operation of the tag applicator 10 at very high speeds such as at 1000 tags per minute. However, an equivalent embodiment for securing the tag 30 in slots 62 includes the use of vacuum lines known in the art for each slot in a tag transfer drum.

Figure 14:
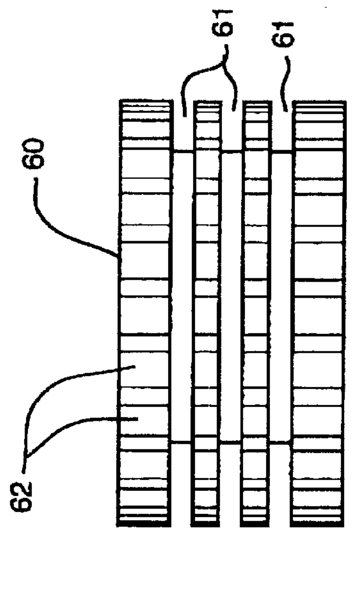
FIG. 14 is a top view of the tag transfer drum of FIG. 12.

Referring to FIG. 14, a top view of the tag transfer drum 60 of FIG. 12 is shown comprising the three grooves 61 around the periphery of the drum 60. The fingers 186, 187, 188 of the ejector fingers arm 58 (FIG. 17) are positioned within the grooves 61, and the ejector fingers 186, 187, 188 eject a tag 30 from the slot 62 for transfer of the tag 30 to an article 96 passing by on a conveyor 94 as illustrated in FIG. 7.

Figure 15:
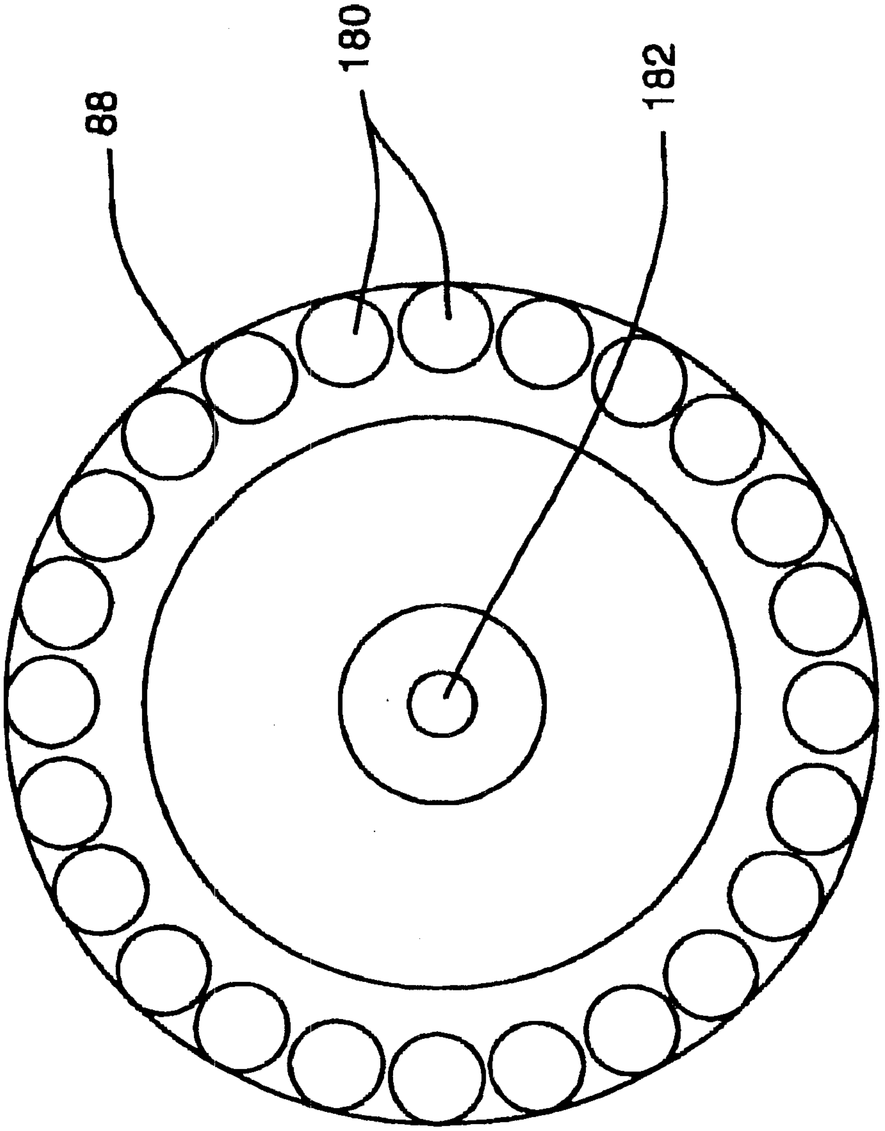
FIG. 15 is a front elevational view of the drum sensor wheel.

Referring to FIG. 3 and FIG. 15, FIG. 15 shows a front elevational view of the drum sensor wheel 88 comprising twenty-four holes 180 around the outer edge of the drum sensor wheel 88. The photo sensor 89 of FIG. 3 is positioned in front of holes 180 for control purposes as each hole 180 passes by the photo sensor 89. An opening 182 in the center of the drum sensor wheel 88 is provided for mounting the drum sensor wheel 88 on the shaft 64 of the pulley 90 which is driven by the servo motor 80, pulley 84 and timing belt 86. When power is applied to the tag applicator 10, the drum 60 will rotate or "home" to the first non-hole surface of the sensor wheel 88. Adjusting this sensor wheel 88 changes the exact position where the drum stops after "homing" and therefore changes the exact position of the tag 30 that is positioned to be transferred to the next article 96. The sensor wheel 88 stops rotation of the drum 60 at fifteen degree intervals for the next tag 30 to be applied when another article 96 is in position to receive the next tag 30.

Ejector Fingers

Figure 17:
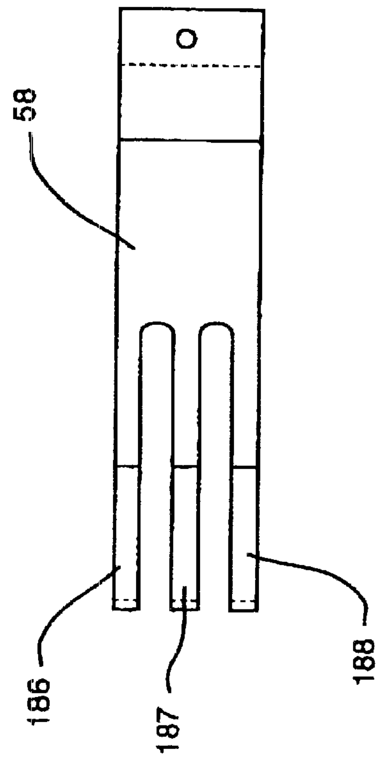
FIG. 17 is a top view of ejector fingers of the ejector fingers arm.
Figure 16:
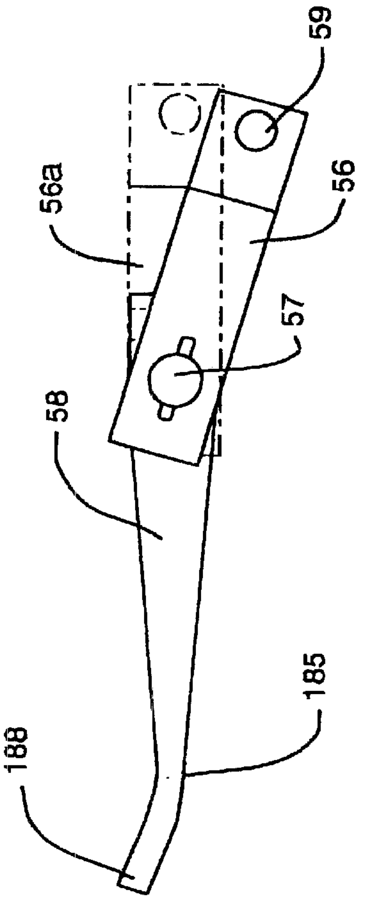
FIG. 16 is a side view of the ejector fingers arm connected to an ejector lever at a pivot shaft.

Referring to FIG. 3, FIG. 7, FIG. 16 and FIG. 17, FIG. 16 shows a side view of the ejector fingers arm 58 connected to the ejector lever 56 at the pivot shaft 57 attached to the mounting panel 41. The ejector fingers arm 58 is adjustable at pivot shaft 57 for proper alignment within the grooves 61 of tag transfer drum 60. The lower portion of the fingers 186, 187, 188 are bent at approximately a thirty degree angle so that the fingers 186, 187, 188 are higher than the plane of the incoming article 96 and the fingers 186, 187, 188 will strike as much as possible of the tag 30 to insure an accurate placement on the article 96 at high speed. This also provides for secure attachment of the tag 30 to the article 96. FIG. 17 shows a top view of the ejector fingers arm 58 comprising the three fingers 186, 187, 188 which are positioned within the three grooves 61 around the drum 60 behind the tags 30. The three fingers 186, 187, 188 eject each tag 30 from the slot 62 for attaching to an article 96 passing under the drum 60 on the conveyor 94.

Controller

Referring now to FIG. 19, a diagram is shown of an ejector fingers servo motor 45 for controlling the ejector fingers arm 58 and the drum servo motor 80 for controlling the incremental or indexed rotation of the drum 60, both servo motors 45, 80 operating under the control of the programmable controller 20, which receives timing inputs from the photo sensor 65 and a conveyor speed encoder 95. An encoder wheel (not shown) having a 12 inch circumference is coupled to the conveyor speed encoder 95 and is positioned on the conveyor 94 for measuring the position and velocity of the advancing articles 96 which are moving toward the tag transfer drum 60. As the encoder wheel rotates one revolution, 2000 pulses are generated which provide the position and velocity data information to the controller 20. However, other encoders that generate other than 2000 pulses per revolution and other encoder wheels having a circumference other than 12 inches, both of which are known in the art, may be used. The programmable controller 20 uses the conveyor position and speed data to determine timing compensation for a "fire command" signal sent to the ejector fingers servo motor 45.

The drive mechanism for actuating the ejector fingers arm 58 comprises an eccentric drive shaft 53 that is coupled to a shaft 50 of the servo motor 45. The ejector rod 52 connects at one end to the eccentric drive shaft 53 via pivot pin 63 and the ejector rod 52 connects at the other end to the ejector lever 56 by pivot pin 59. The ejector lever 56 and the ejector fingers 58 are both rigidly connected to the pivot shaft 57, and the ejector lever 56 and the ejector fingers arm 58 together pivot about the pivot shaft 57.

Still referring to FIG. 19, the mode of operation of the surveillance tag applicator 10 is as follows:

(a) Photo sensor 65 detects the leading edge of an article 96 advancing on the conveyor 94, and a "registration" signal is sent to the controller 20;

(b) Controller 20 generates a "fire command" signal to ejector fingers servo motor 45; NOTE: Controller 20 determines the timing of the "fire command" based on position and velocity of the article 96 and desired location of the tag 30 on the article 96;

(c) Ejector fingers servo motor 45 moves one revolution, and tag 30 is placed on article 96 after ejector fingers servo motor 45 moves 180 degrees. An eccentric drive shaft 53 is coupled to the shaft of servo motor 45;

(d) Ejector fingers servo motor 45 generates a "revolution complete" signal which is sent to the controller 20;

(e) Controller 20 receives the "revolution complete" signal from ejector fingers servo motor 45, and controller 20 sends a "confirming" signal to the drum servo motor 80; and (f) Drum servo motor 80 receives the "confirming" signal from controller 20, and commands the drum servo motor 80 to turn (i.e. to index) by an amount of one/twenty-fourth of a revolution. (NOTE: This is because the drum 60 has 24 slots). By incrementing or indexing one/twenty-fourth of a revolution, the drum 60 puts the next tag 30 in position for application to the next article 96.

Figure 20:
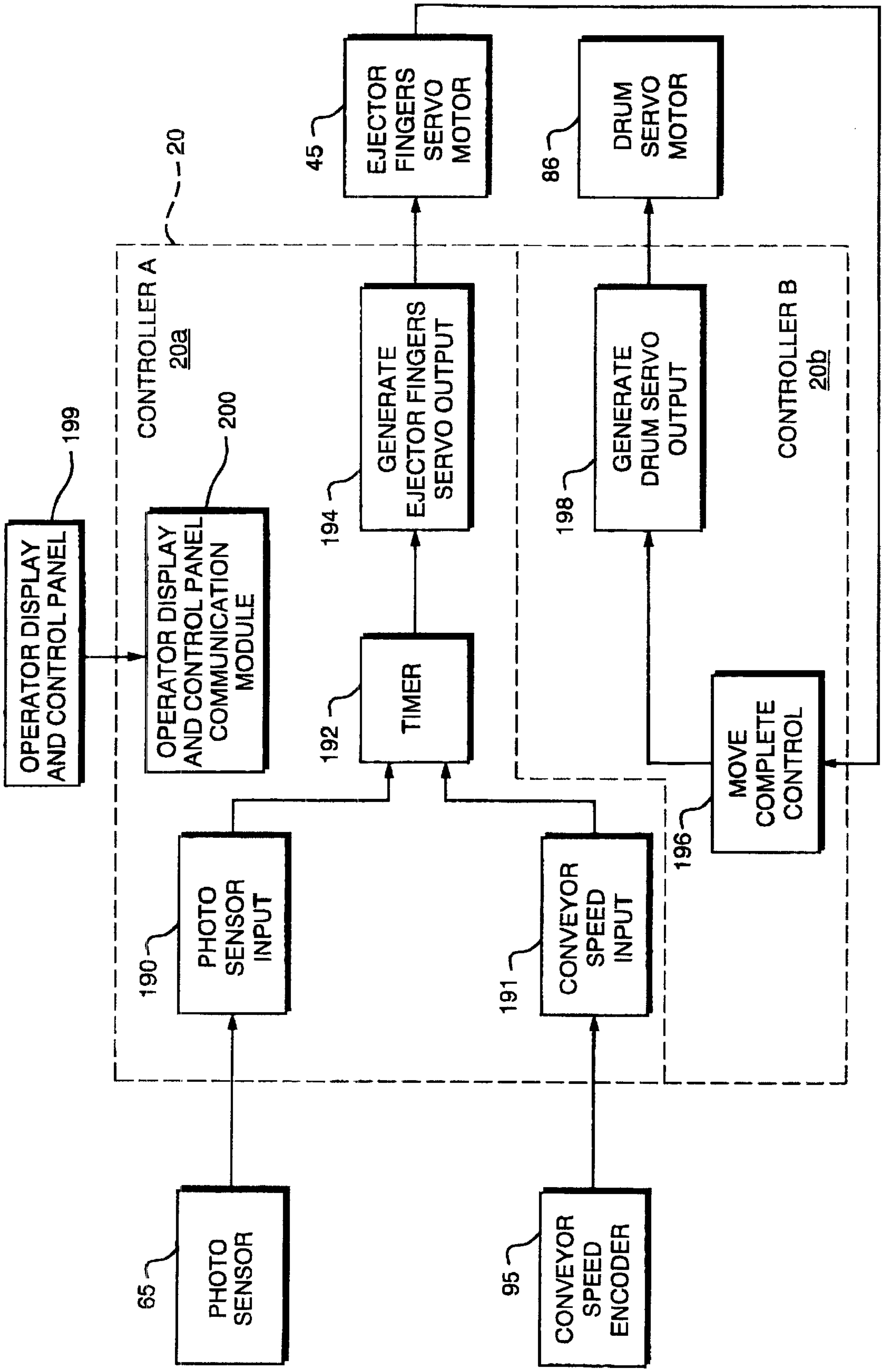
FIG. 20 is a block diagram of the timing functions performed by the programmable controller for controlling the operation of the surveillance tag applicator.

Referring now to FIG. 20, a block diagram is shown of the timing functions performed by the programmable controller 20 which comprises controller A 20*a* and controller B 20*b*. The controller A 20*a* receives a photo sensor input 190 from the photo sensor 65 and a conveyor speed input 191 from the conveyor speed encoder 95. The photo sensor input 190 indicates that the leading edge of an article 96 is approaching the drum 60 and the conveyor speed input 191 indicates the speed of the conveyor 94 on which the article 96 is moving. A timer 192 receives the photo sensor input 190 and the conveyor speed input 191 and generates a "timed" signal which is sent to the generate ejector fingers servo output 194. The generate ejector fingers servo output 194 generates a signal to activate the ejector fingers servo motor 45, which results in the transfer of a tag 30 to the article 96.

The controller B 20*b* receives a "move complete" signal from the ejector fingers servo motor 45 when the ejector fingers servo motor 45 has been activated and transfers the tag 30 to the article 96. Then, the controller B 20*b* generates a drum servo output 198 which is sent to the drum servo motor 80 and indexes the drum 60 to position the next tag 30 so that the ejector fingers arm 58 can apply the next tag 30 to the next article 96.

An operator display and control panel 199 is provided on the surveillance tag applicator 10 which displays data from and inputs data to controller A 20*a* via an operator display and control panel communication module 200. The displays and functions of the operator display and control panel 199 are as follows:

(a) Position From Leading Edge: Operator enters numeric value of how far back from the leading edge of an article 96 that he wants a tag 30 placed.

(b) Inc From Leading Edge: Inc is short for increment; this switch gives the operator the opportunity to manually increase the distance from the leading edge of article 96 to the tag 30 by a fixed amount (e.g. 0.02 inches) every time this switch is touched. This allows the operator to make an "eyeball" adjustment to tag 30 location while the conveyor 94 is running articles 96.

(c) Dec From Leading Edge: This switch is similar to (b) above except the distance from the leading edge of article 96 to the tag 30 is decreased by a fixed amount every time this switch is touched. Dec is short for decrement.

(d) Tag Frequency: The operator can choose to put a tag 30 on all articles 96 that pass the drum 60 or, conversely, only place a tag 30 on some fraction of the article 96 (this is called fractional tagging). The operator enters an integer value in this register to tell the controller 20 what the fraction will be (i.e. if he enters 3, the unit will apply a tag 30 on every third article.

(e) Random Tagging Is On: If the operator chooses fractional tagging, he can also choose to randomly apply tags 30 (i.e. if he chooses random, then on average there will be one tag per every three articles 96, but the tags 30 will not be placed consistently on every third blank). If the operator wants tags 30 placed consistently on every third blank, he would touch the screen where it says "Random Tagging Is On" and the words would change to "Random Tagging Is Off".

(f) Total Tags: This is a counter display that shows the total number of tags 30 that have been placed including all previous jobs since the tag applicator 10 was new.

(g) Total Articles: This is a counter display that shows the total number of articles 96 that have been run while the applicator 10 has been "on" including all previous jobs.

(h) Tags This Run: This is a counter display that shows the total number of tags 30 that have been placed since the start of the current job. Note: "Reset Tags This Run" is the switch that the operator uses to zero out the "tags this run" register when he starts a new job.

(i) Articles This Run: This is a counter display that shows the total number of articles 96 that have been run since the start of the current job. Note: “Reset Articles This Run” is the switch that the operator uses to zero out the “Articles This Run” display when he starts a new job. Note: when running the tag applicator 10 in fractional mode, the number of tags 30 applied will be less than the number of articles 96. These counter displays give the operator confirmation that he is in fact applying the correct number of tags for the number of articles 96 that are run.

(j) Avg Articles/Min: Displays the current average rate of articles 96 running on the machine.

(k) Belt Feet/Minute: Displays the current speed of the conveyor 94 which is transporting articles 96.

The controller 20 is readily programmed based on the above described mode of operation and programming instructions provided by the manufacturer of the controllers 20*a*, 20*b*. However, a computer program listing in source language is provided which is loaded into controller A 20*a*, and controller A 20*a* provides control signals to controller B 20*b*. The controller A 20*a* may be embodied by Model A-B ULTRA 5000, manufactured by Allen Bradley of Milwaukee, Wis., and the controller B 20*b* may be embodied by Model ULTRA 100 manufactured by Allen Bradley of Milwaukee, Wis. The operator display and control panel 199 may be embodied by Model Panel View 300 manufactured by Allen Bradley of Milwaukee, Wis. Also, the encoder 95 may be embodied by Model 845H-SJDZ14DNY2C manufactured by Allen Bradley of Milwaukee, Wis. Further, the ejector fingers servo motor 45 may be embodied by Model Y2012-2-00AA manufactured by Allen Bradley of Milwaukee, Wis. The drum servo motor 80 may be embodied by Model H3016NHD0AA manufactured by Allen Bradley of Milwaukee, Wis. There are other equivalent control systems utilizing electrical control components that could be configured to control the surveillance tag applicator 10 invention as described herein. The important similarity of equivalent control systems vs. the control system as described in this application is that the physical embodiment of the invention as described herein is preserved, i.e. appropriate means are provided to control the tag transfer drum 60, the ejector fingers arm 58, the web rewind assembly 18, and all other physical components of the invention as described herein. One such alternate control system would use a discrete programmable logic controller (PLC) that communicates with and controls the activation of two servo drives/motors in like manner to the control of ejector fingers servo motor 45 and drum servo motor 80 as described herein. This is just one example of other control systems that could be employed using the wide range of industrial control products known in the art.

This invention has been disclosed in terms of certain embodiments. It will be apparent that many modifications can be made to the disclosed apparatus and method without departing from the invention. Therefore, it is the intent of the appended claims to cover all such variations and modifications as come within the true spirit and scope of this invention.

CONTROLLER PROGRAM LISTING SOURCE LANGUAGE

```
/* I/O Mapping Definitions
// Input 1 - Photo Sensor Output 1 = Index Label
// Input 2 - spare Output 2 = Fault
```

-continued

```
// Input 3 - E-Stop Output 3 = Running
// Input 4 - Start Output 4 = Tag_Counter
// Input 5 - Stop Output 5 = Blank_Counter
// Input 6 - Reset Output 6 = spare
// Input 7 - Manual_Eject Output 7 = spare
// Input 8 - Manual_Index Output 8 = spare
*/
/* FloatArray - Mapping Definitions
F8:0 Sensor_Distance
F8:1 Placement_Offsett
F8:2 Line_Speed_FPM
F8:3 Blank_Count
F8:4 Tag_Count
F8:5 Seconds
F8:6 Home_Offset
F8:7 Encoder_PPI
F8:8 spare
F8:10 Ejector_Command_Position
F8:11 Ejector_Actual_Position
F8:12 Ejector_Error
F8:13 Ejector_Command_Velocity
F8:14 Ejector_Actual_Velocity
F8:15 Aux_Actual_Velocity
F8:16 Ejector_Motor_Current
F8:17 spare
F8:18 Total_Tag_Count
F8:19 Total_Blank_Count
F8:20 Test_Timer
F8:21 Move_Time
F8:22 Stored_Reg_Position
F8:23 System_Clock_Seconds
*/
/* LongArray - Mapping Definitions
N7:0 Tag_frequency
N7:1 spare
N7:2 spare
N7:3 Spare
N7:4 spare
N7:5 spare
N7:6 Servo Fault
N7:7 Fault_Echo
N7:8 Test_Bit
N7:9 Spare
N7:10 Active_Screen
N7:11 Forced_Screen
*/
#include "motion.h" file://Use Motion Library
#include "system.h"
long First_Scan, Count_Flag, Tag_Frequency,Aux_Encoder_Latch,
InPosition;
long Frequency_Count = 0;
floatAux_Encoder_Pos, Last_Encoder_Pos, Placement_Offset,
Sensor_Distance, Ejector_Command_Position,
Phase_Correction, Encoder_IPS, End_Encoder_Pos, Move_Time;
float Ejector_PPR = 8000; file://Encoder Pulses per Ejector Revolution
float Aux_Encoder_PPI = 1000; file://Auxillary Encoder Pulses per Inch
float Ejector_Speed = 5000; file://Ejector RPM
float Ejector_Accel = 5000; file://Ejector Move Accel in Revs per second
float Ejector_Decel = 5000; file://Ejector Move Decel in Revs per second
int main() file://eject routine
{
InitMotionLibrary(); file://Initialize the motion library functions
LongArraySelect("N7"); file://Select N7 integer array
FloatArraySelect("F8"); file://Select F8 float array
while (!StopRequested()) file://Loop until program is stopped
{
if (OutputGetState(3)==0) Frequency_Count = 0; // Not running
else
// If running
{
LatchOnInput(3,1,1); file://Arm Rising edge of Index pulse,
Auxillary Encoder, input 1 rising
while ((!LatchTriggered(3)&&!LongArrayGetElement(8)) &&
OutputGetState(3)) file://Wait for marker or E-Stop
{
Tag_Frequency LongArrayGetElement(0);
// Get tag increment
Placement_Offset = (FloatArrayGetElement(1));
file://Get part length
```

-continued

```
Sensor_Distance = FloatArrayGetElement(0);
file://Get Sensor Distance
Encoder_IPS = FloatArrayGetElement(15);
file://Get Aux encoder velocity
Aux_Encoder_PPI = FloatArrayGetElement(7);
file://Get Encoder resolution pulses per inch
Phase_Correction = Encoder_IPS*FloatArrayGetElement(26);
file://Line Speed * eject time
}
if (OutputGetState(3))
{
++Frequency Count;
OutputSetState(5,1);
file://Set Count Blank output
file://On Demand - Synch
if (Frequency_Count == 1)
{
(Last_Encoder_Pos = (LatchGetOutput
(3)/Aux_Encoder_PPI);
FloatArraySetElement(22, Last_Encoder_Pos);
End_Encoder_Pos =
(Last_Encoder_Pos+Placement_Offset+
Sensor_Distance−Phase_Correction);
while ((EncoderGetOutput(2))
<(End_Encoder_Pos*Aux_Encoder_PPI)&&!LongArrayGetElement(8))
{
if (OutputGetState(3) == 0) break;}
if (OutputGetState(3))
{
if (LongArrayGetElement(8)) Sleep
(FloatArrayGetElement(20)*1000);
OutputSetState(1,0);
file://Turn off labeler pulse
MoveSetAcc(FloatArrayGetElement(28)*
8000,0); file://Set Move Accel
MoveSetDec(FloatArrayGetElement(29)*
8000.0);
MoveSetVel(FloatArrayGetElement(27)*
8000.0/60.0); file://Set Move Velocity
MoveDistance(Ejector_PPR);
Move_Time = GlobalTickCount/8000.0;
InPosition = OFF;
while (MoveInProgress() && (OutputGetState
(3)))
{
file://if (AxisGetPosError() <100 &&
AxisGetPosError() >− 100 &&!MoveinProgress())
// InPosition = ON;
file://else
// InPosition = OFF;
}
Move_Time = GlobalTickCount/8000.0 -
Move_Time;
FloatArraySetElement(21, Move_Time);
if (OutputGetState(3))
{
OutputSetState(4,1);
file://Set Count Tag Output
OutputSetState(1,1);
file://Pulse output to labeler
file://Sleep(10);
file://Leave pulse on for 10 msec
file://OutputSetState(1,0);
file://Turn off labeler pulse
}
}
}
if (Frequency_Count != 1)
{
if (LongArrayGetElement(8)) Sleep
(FloatArrayGetElement(20)*1000);
else (Sleep(20));
}
if (Frequency_Count >= (LongArrayGetElement(0)))
Frequency_Count = 0;
while ((InputGetState(1))&&(OutputGetState(3)));
}
}
} // end of while loop
```

-continued

```
return 0;
} // end of eject function
/* I/O Mapping Definitions
// Input 1 - Photo Sensor Output 1 = Index Label
// Input 2 - spare Output 2 = Fault
// Input 3 - E-Stop Output 3 = Running
// Input 4 - Start Output 4 = Tag_Counter
// Input 5 - Stop Output 5 = Blank_Counter
// Input 6 - Spare Output 6 = spare
// Input 7 - Manual_Eject Output 7 = spare
// Input 8 - Manual_Index Output 8 = spare
*/
/* FloatArray - Mapping Definitions
F8:0 Sensor_Distance
F8:1 Placement_Offsett
F8:2 Line_Speed_FPM
F8:3 Blank_Count
F8:4 Tag_Count
F8:5 Seconds
F8:6 Home_Offset
F8:7 Encoder_PPI
F8:8 spare
F8:10 Ejector_Command_Position
F8:11 Ejector_Actual_Position
F8:12 Ejector_Error
F8:13 Ejector_Command_Velocity
F8:14 Ejector_Actual_Velocity
F8:15 Aux_Actual_Velocity
F8:16 Ejector_Motor_Current
F8:17 Blanks_Per_Minute
F8:18 Total_Tag_Count
F8:19 Total_Blank_Count
F8:20 Test_Timer
F8:21 Move_Time
F8:22 Stored_Reg_Position
F8:23 System_Clock_Seconds
*/
/* LongArray - Mapping Definitions
N7:0 Tag_Frequency
N7:1 Start_PB
N7:2 Stop_PB
N7:3 Man_Eject_PB
N7:4 Man_Index_PB
N7:5 Running_Status
N7:6 Servo Fault
N7:7 Fault_Echo
N7:8 Test_Bit
N7:9 Spare
N7:10 Active_Screen
N7:11 Forced_Screen
*/
#include "motionh" file://Use Motion Library
#include "system.h"
// Uninitialized Integers
longi, Success, Blank_Count, Total_Blank_Count, Tag_Count,
Total_Tag_Count, Servo_Status,
Homed,
Homing, PV_Active_Screen, PV_Forced_Screen, State, I_O_Mask,
Servo_Fault, Fault_Echo, First_Aux_Sample, BPM_Start;
// Uninitialized floats
float
Home_Offset, Ejector_Command_Position,
Ejector_Actual_Position,
Ejector_Command_Velocity,
Ejector_Actual_Velocity, Aux_Actual_Velocity, Ejector_Error,
Seconds, Delta_Seconds, Time_Between_Blanks, Last_Blank_Ticks
// Initialized floats
long Ejector_PPR = 8000; file://Encoder Pulses per Ejector Revolution
long Aux_Encoder_PPI = 1000;//Auxillary Encoder Pulses
per Inch
float Home_Velocity_RPS = 0.5; file://Homing Velocity in Revs
per second
float Home_Accel_RPS = 10000; file://Homing Acceleration in Revs
per sec squared
float Home_Decel_RPS 10000; file://Homing Deceleration in Revs
per sec squared
int main() file://Main routine
{
InitMotionLibrary(); file://Initialize the motion library functions
```

-continued

```
OutputSetAllOff(); file://Clear all outputs
LongArraySelect("N7"); file://Select N7 integer array
FloatArraySelect("F8"); file://Select F8 float array
Homed = 0; file://Reset Ejector Homed
Homing = 0; file://Reset Homing Status
OutputSetState(2, 1); file://Set Fault Light On
for (i=1;i<20;i++) LongArraySetElement(i,0); file://Clear all N7 Global
Variables on power up, except tag frequency
Servo__Fault = 0; file://Set Servo Fault to 11 on power up, homing
required
while (!StopRequested()) file://Loop until program is stopped
{
// E-Stop string open and axis enabled, disable the Ejector
if ((!InputGetState(3) &&
AxisIsEnabled())||((OutputGetState(3))&&!AxisisEnabled()))
{
AxisDisable(); file://Disable Ejector
Homed = 0; file://Reset Homed
OutputSetState(2,1); file://Set Fault Light On
OutputSetState(1,0); file://Set Index Label off
OutputSetState(3,0); file://Set Running off
OutputSetState(4,0); file://Set Tag Counter off
OutputSetState(5,0); file://Set Blank Counter off
FloatArraySetElement(17,0); file://Set Blank parts per minute to zero
Seconds = 0; file://Reset clock seconds counter
FloatArraySetElement(5,0);
}
// E-Stop string closed and axis is not enabled and fault =
0 – Enable and Home Ejector
if (InputGetState(3) && !AxisIsEnabled() && InputGetState(3) &&
(Servo__Fault == 0)&& (Fault__Echo))
{
ControlClearFault(); file://Clear any servo faults
Success=(AxisEnable()); file://Enable Axis, check for success
if (Success==0) file://Start homing if axis is enabled{
Homing = 1;
PV__Forced__Screen = 6;
file://Force PV Homing Screen
LongArraySetElement(11,PV__Forced__Screen); // Update Global
variable
Home__Offset = (FloatArrayGetElement(6)); file://Get latest offset from
PV
OutputSetState(2,0); file://Set
Fault Light OFF
JogSetVel(Home__Velocity__RPS*Ejector__PPR); file://Set Jog velocity
JogSetAcc(Home__Accel__RPS*Ejector__PPR); file://Set Jog Accel
JogSetDec(Home__Accel__RPS*Ejector__PPR); file://Set Jog Decel
JogForward();
file://Start Jog
LatchOnIndex(1,1,TRUE);
file://Arm Rising edge of Index pulse, Ejector motor
while (!LatchTriggered(1) && InputGetState(3))) file://Wait for marker or
E-Stop
{
}
JogStop();
file://Stop Jog
while (JogInProgress() && InputGetState(3)) file://Wait till stopped or E-
Stop
{
}
if (InputGetState(3)) // Not in
E-Stop condition
{
AxisSetFeedbackOffset(-((Home__Offset*Ejector__PPR)
+LatchGetOutput(1)));
MoveSetPos(AxisGetCommandPos());
file://Redefine Ejector position with new offset
MoveSetVel(Home__Velocity__RPS*Ejector__PPR); file://Set
Move velocity
MoveSetAcc(Home__Accel__RPS*Ejector__PPR); file://Set
Move Accel
MoveSetDec(Home__Accel__RPS*Ejector__PPR); file://Set
Move Decel
MovePosition(0);
file://Move to Absolute 0
while (MoveInProgress() && InputGetState(3))//Wait till stopped
or E-Stop
{
```

-continued

```
{
} (InputGetState(3)) Homed=1; // Not in E-Stop
condition
}
if (!Homed)
file://E-stop occurred during homing
{
OutputSetState(2,1);
file://Set Fault Light On
AxisDisable();
file://Disable Ejector axis
}Homing = 0;
PV__Forced__Screen = 4;
file://Select PV Screen Control Menu
LongArraySetElement(11, PV__Forced__Screen); // Update Global
variable
Sleep(1000);
file://Delay to allow screen change
}
}
file://Monitor screen changes by getting PV Active Screen
PV__Active__Screen=LongArrayGetElement(10); file://Get PV
Active Screen
PV__Forced__Screen = 0; file://Unlock PV Screen
Control
LongArraySetElement(11, PV Forced__Screen); // Update Forced
Screen Global
variable
// Monitor RUN pushbutton
if ((Homed == 1) &&
(InputGetState(4)||LongArrayGetElement(1))) // Start
PB pressed
{
OutputSetState(3,1);
LongArraySetElement(1,0);
}
if (OutputGetState(3)&&(InputGetState(5)||LongArrayGetElement(2)))//
Stop PB pressed
{
OutputSetState(3,0);
LongArraySetElement(2,0);
}
// Tag Count Logic
if (OutputGetState(4))
{
Tag__Count = FloatArrayGetElement(4);
FloatArraySetElement(4,Tag__Count+1);
Total__Tag__Count = FloatArrayGetElement(18);
FloatArraySetElement(18, Total__Tag__Count+1);
OutputSetState(4,0);
}
// Blank Count Logic
if (OutputGetState(5))
{
Time__Between__Blanks = GlobalTickCount/8000.0 - Last__Blank__Ticks;
Last__Blank__Ticks = GlobalTickCount/8000.0;
FloatArraySetElement(17,(60/Time__Between__Blanks));
Blank__Count = FloatArrayGetElement(3);
FloatArraySetElement(3,Blank__Count+1);
Total__Blank__Count = FloatArrayGetElement(19);
FloatArraySetElement(19, Total__Blank__Count+1);
OutputSetState(5,0);}
// Monitor Eject pushbutton
// Eject PB pressed, ejector homed and not in auto
if ((Homed == 1) && (InputGetState(7)||LongArrayGetElement(3)) &&
(OutputGetState(3)==0))
{
LongArraySetElement(3,0);
MoveSetVel((3000/60)*Ejector__PPR); file://Set Move velocity
MoveSetAcc(250000*Ejector__PPR); file://Set Move Accel
MoveSetDec(250000*Ejector__PPR); file://Set Move Decel
MoveDistance(1*Ejector__PPR);
Sleep(50);
while ((InputGetState(7)) && (OutputGetState(3)==0) &&
(InputGetState(3)));
}
// Running Status to Panelview
if (OutputGetState(3)) LongArraySetElement(5,1);
else LongArraySetElement(5,0);
```

-continued

```
// Monitor Index Label pushbutton;
// Index PB pressed, not in auto, E-Stop ok
if ((OutputGetState(3)==0) &&
(InputGetState(8)||LongArrayGetElement(4)) &&
(InputGetState(3)))
{
LongArraySetElement(4,0);
OutputSetState(1,1); file://Pulse
output to labeler
Sleep(10)
file://Leave pulse on for 10 msec
OutputSetState(1,0); file://Turn
off labeler pulse
while ((InputGetState(8))&&(OutputGetState(3)==0)&&
(InputGetState(3)));
}
file://Fault Detection
Fault_Echo = LongArrayGetElement(7); file://Read PV Fault
Acknowledge
Echo
if (Fault_Echo) file://If true
PV Fault Acknowledge PB was pressed
{
Servo_Fault = 0; file://Clear
servo fault word, set homing required
}
file://Echo is on for 1 second, same alarm regenerated if not corrected.
else if (InputGetState(3)= =0) Servo_Fault = 1; file://Generate
E-Stop Alarm if PV not acknowledging
else Servo_Fault = ControlGetFault(); file://Read servo faults if not in E-
Stop
LongArraySetElement(6,Servo_Fault); file://Send Servo Fault
word to PV Alarms//Position Status Display
Ejector_Command_Position = (AxisGetCommandPos() %
Ejector_PPR);
file://Ejector position 0 to 1
Ejector_Command_Position = Ejector_Command_Position /
Ejector_PPR;
FloatArraySetElement(10,Ejector_Command_Position);
file://Send Command Position to PV
Ejector_Actual_Position = (AxisGetFeedbackPos() % Ejector_PPR);
file://Ejector Actual position 0 - 1
Ejector_Actual_Position = Ejector_Actual_Position /
Ejector_PPR;
FloatArraySetElement(11,Ejector_Actual_Position);
file://Send Actual Position to PV
Ejector_Error = (AxisGetPosError() % Ejector_PPR);
Ejector_Error = Ejector_Error / Ejector_PPR;
FloatArraySetElement(12, Ejector_Error); file://Send Position
Error to PV
// System Clock Display
FloatArraySetElement(23,GlobalTickCount/8000.0);
file://Velocity Status Display
Ejector_Command_Velocity = (AxisGetCommandVel() /
Ejector_PPR)*60;
file://Ejector velocity 0 to 3000 RPM
FloatArraySetElement(13, Ejector_Command_Velocity);
file://Send Velocity to PV
Ejector_Actual_Velocity = (AxisGetFeedbackVel() / Ejector_PPR)*60;
file://Ejector Actual velocity 0 to 3000 RPM
FloatArraySetElement(14, Ejector_Actual_Velocity);
file://Send Actual Velocity to PV
First_Aux_Sample = EncoderGetOutput(2);
file://Sample Aux Encoder position
Aux_Encoder_PPI = FloatArrayGetElement(7); file://Get Encoder
resolution pulses per inch
Sleep (10);
Delta_Seconds = GlobalTickCount/8000.0 - FloatArrayGetElement(23);
Seconds=Seconds+Delta_Seconds;
FloatArraySetElement(5,Seconds);
file://Delay 10 msec
file://Calculate speed od auxillary encoder by taking secon sample,
dividing by pulses per inch and scaling to IPS
Aux_Actual_Velocity = (EncoderGetOutput(2)-First_Aux_Sample);
Aux_Actual_Velocity =
((Aux_Actual_Velocity/Aux_Encoder_PPI)/Delta_Seconds):
FloatArraySetElement(15,Aux_Actual_Velocity);
file://Send Position Error to PV
FloatArraySetElement(16,AxisGetCommandCur());
```

-continued

```
file://Send Current Command to PV
FloatArraySetElement(2,(Aux_Actual_Velocity*60/12)); file://Send
Line Speed in FPM to PV
/*
//
Blanks per minute display
if (Seconds >=5)
{
FloatArraySetElement(17,
(((FloatArrayGetElement(19))-BPM_Start)*12));
BPM_Start = (FloatArrayGetElement(19));Seconds = 0;
}
*/
} // end of while loop
OutputSetAllOff(); file://Clear all outputs
AxisDisable(); file://Disable Ejector
return 0;
} // end of main function
```

What is claimed as new and desired to be secured by Letters Patent of the United States is:

1. An apparatus for high speed application of tags to advancing articles comprising:

a source of a plurality of tags on a continuous web;

a tag transfer drum having a plurality of slots for engaging said plurality of tags on said continuous web as said drum rotates;

a first servo motor having a shaft to which said drum is attached for rotating said drum in predetermined increments;

means positioned adjacent to said drum for pressing each tag of said plurality of tags into one of said plurality of slots as said tag transfer drum rotates;

means positioned adjacent to said drum for removing said web from said tags secured within said plurality of slots of said drum;

means for ejecting each of said plurality of tags onto one of said advancing articles when said advancing articles pass by said rotating drum; and a second servo means having a shaft to which said ejecting means is attached for controlling said ejecting means.

2. The apparatus as recited in claim 1 wherein said apparatus comprises a sensor for generating a control signal upon detection of each of said advancing articles.

3. The apparatus as recited in claim 2 wherein said apparatus comprises means coupled to said first servo means and said second servo means for controlling said rotating drum and said ejecting of said tags in response to said control signal.

4. The apparatus as recited in claim 3 wherein said controlling means further comprises means for selecting which of said advancing articles receives one of said tags.

5. The apparatus as recited in claim 1 wherein said means for removing said web from said tags comprises a rewind assembly for winding said web on a reel.

6. The apparatus as recited in claim 5 wherein said means for removing said web from said tags comprises a web stripper positioned adjacent to said tag transfer drum whereby said web stripper pulls said web away from said tag secured in said drum as said tag approaches a lower end of said web stripper, and said web moves under said lower end of said web stripper and then away from said web stripper lower end to said web rewind assembly.

7. The apparatus as recited in claim 6 wherein said web stripper comprises a pair of spaced-apart vertically protruding members on the face of said web stripper facing said tag transfer drum for providing additional pressure on each tag positioned in said slots of said drum to secure each tag in said slots for said high speed application of said tags to said articles.

8. The apparatus as recited in claim 1 wherein said apparatus comprises means for turning said tag transfer drum ninety degrees to enable said tags to be ejected onto said advancing articles either perpendicular to the direction of travel of said advancing articles or parallel to said direction of travel of said advancing articles in accordance with a predetermined position for said turning means.

9. The apparatus as recited in claim 1 wherein each of said plurality of slots around the circumference of said tag transfer drum comprises a pressure fit for holding each of said tags.

10. The apparatus as recited in claim 1 wherein said plurality of tags on said continuous web are spaced-apart at equal intervals.

11. The apparatus as recited in claim 1 wherein said apparatus comprises means for leveling said tag transfer drum with respect to a surface of said advancing articles receiving one of said tags.

12. An apparatus for high speed application of tags to advancing articles comprising:

a source of a plurality of tags on a continuous web;

a tag transfer drum having a plurality of slots for engaging said plurality of tags on said continuous web as said drum rotates;

a first servo motor having a shaft to which said drum is attached for rotating said drum in predetermined increments;

means positioned adjacent to said drum for pressing each tag of said plurality of tags into one of said plurality of slots as said tag transfer drum rotates;

means positioned adjacent to said drum for removing said web from said tags secured within said plurality of slots of said drum and winding up said web devoid of said tags;

means positioned on said apparatus for generating a sensor signal upon detection of each of said advancing articles;

means for ejecting each of said plurality of tags onto one of said advancing articles when said advancing articles pass by said rotating drum;

a second servo means having a shaft to which said ejecting means is attached for controlling said ejecting means; and means coupled to said first servo means and said second servo means for controlling said rotating drum and said ejecting means in response to said sensor signal.

13. The apparatus as recited in claim 12 wherein said means for removing said web from said tags comprises a web stripper positioned adjacent to said tag transfer drum whereby said web stripper pulls said web away from said tag secured in said drum as said tag approaches a lower end of said web stripper, and said web moves under said lower end of said web stripper and then away from said web stripper lower end to said web winding-up means.

14. The apparatus as recited in claim 13 wherein said web stripper comprises a pair of spaced-apart vertically protruding members on the face of said web stripper facing said tag transfer drum for providing additional pressure on each tag positioned in said slots of said drum to secure each tag in said slots for said high speed application of said tags to said articles.

15. The apparatus as recited in claim 12 wherein said apparatus comprises means for turning said tag transfer drum ninety degrees to enable said tags to be ejected onto said advancing articles either perpendicular to the direction of travel of said advancing articles or parallel to said direction of travel of said advancing articles in accordance with a predetermined position for said turning means.

16. The apparatus as recited in claim 12 wherein each of said plurality of slots around the circumference of said tag transfer drum comprises a pressure fit for holding each of said tags.

17. The apparatus as recited in claim 12 wherein said plurality of tags on said continuous web are spaced-apart at equal intervals.

18. The apparatus as recited in claim 12 wherein said controlling means further comprises means for selecting which of said advancing articles receives one of said tags.

19. The apparatus as recited in claim 12 wherein said apparatus comprises means for leveling said tag transfer drum to be parallel to a surface of said advancing articles receiving one of said tags.

20. A method of applying tags at high speed to advancing articles comprising the steps of:

supplying a plurality of tags on a tag carrier web to a tag transfer drum;

engaging said tag carrier web on said tag transfer drum with means for placing each of said plurality of tags into one of a plurality of slots around the circumference of said tag transfer drum;

rotating said drum to engage a next one of said plurality of tags in a next slot of said drum;

extending at least one ejector finger into a groove around the circumference of said drum;

removing said web from each of said tags secured into said slots as said drum is rotated;

ejecting each of said tags onto an advancing one of said articles with said ejector finger;

providing a web stripper positioned adjacent to said tag transfer drum whereby said web stripper pulls said web away from each of said tags as said tags approach a lower end of said web stripper and said web travels under said lower end of said web stripper and to a web rewind assembly; and providing a pair of spaced-apart vertical protruding members on the face of said web stripper adjacent to said tag transfer drum for providing an additional pressure on each tag positioned in said slots of said drum to secure said tags in said slots.

21. The method as recited in claim 20 wherein said method comprises the step of winding-up said web removed from said tags on a reel as said drum is rotated.

22. The method as recited in claim 20 wherein said method comprises the step of turning said tag transfer drum ninety degrees to enable said tags to be ejected onto said advancing articles either perpendicular to the direction of travel of said advancing articles or parallel to the direction of travel of said advancing articles.

23. The method as recited in claim 20 wherein said step of engaging said tag carrier web and said tag transfer drum by means for pressing each of said tags into one of said plurality of slots around the circumference of said tag transfer drum comprises the step of providing a pressure fit in each of said slots for securing each of said tags within said slots.

24. The method as recited in claim 20 wherein said method comprises the step of providing a sensor for generating a control signal upon detection of each of said advancing articles.

25. The method as recited in claim 24 wherein said method comprises the step of providing a controller for controlling the rotation of said drum following transfer of one of said tags in said slots of said drum onto said advancing articles in response to said control signal.

26. The method as recited in claim 25 wherein said step of providing a controller comprises the step of selecting which ones of said advancing articles receive one of said tags.

27. The method as recited in claim 20 wherein said method comprises the step of leveling said tag transfer drum to be parallel to a surface of said advancing articles receiving one of said tags.

28. A method of applying tags at high speed to advancing articles comprising the steps of:

supplying a plurality of tags on a tag carrier web to a tag transfer drum;

engaging said tag carrier web on said tag transfer drum with means for pressing each of said plurality of tags into one of a plurality of slots around the circumference of said tag transfer drum;

providing a first servo means having a shaft to which said tag transfer drum is attached for rotating said drum in predetermined increments;

generating a sensor signal upon detection of each of said advancing articles approaching said drum;

removing said web from said tags secured within said plurality of slots of said drum with a web stripper which provides a secondary pressure on said tags in said slots;

winding said web devoid of said tags on a reel;

extending at least one ejector finger of an ejecting means into a groove around the circumference of said tag transfer drum;

providing a second servo means having a shaft on which said ejecting means is attached for controlling said ejector finger;

ejecting each of said tags on said drum onto one of said advancing articles with said ejector finger; and controlling said rotation of said drum and said ejecting means in response to said sensor signal with a programmable controller coupled to said first servo means and said second servo means.

29. The method as recited in claim 28 wherein said method comprises the step of turning said tag transfer drum ninety degrees to enable said tags to be ejected onto said advancing articles either perpendicular to the direction of travel of said advancing articles or parallel to the direction of travel of said advancing articles.

30. The method as recited in claim 28 wherein said method comprises the step of leveling said tag transfer drum to be parallel to a surface of each of said advancing articles receiving one of said tags.

* * * * *